(12) United States Patent
Phillips et al.

(10) Patent No.: US 10,554,559 B2
(45) Date of Patent: Feb. 4, 2020

(54) BANDWIDTH MANAGEMENT OF MULTICAST ADAPTIVE BITRATE (MABR) DATA STREAMS IN AN IPTV-OVER-DOCSIS SYSTEM

(71) Applicant: TELEFONAKTIEBOLAGET LM ERICSSON (PUBL), Stockholm (SE)

(72) Inventors: Chris Phillips, Hartwell, GA (US); Raj Nair, Lexington, MA (US); Prabhudev Navali, Westford, MA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 30 days.

(21) Appl. No.: 15/668,512

(22) Filed: Aug. 3, 2017

(65) Prior Publication Data
US 2018/0212882 A1 Jul. 26, 2018

Related U.S. Application Data

(60) Provisional application No. 62/450,252, filed on Jan. 25, 2017.

(51) Int. Cl.
*H04L 12/803* (2013.01)
*H04L 12/801* (2013.01)
(Continued)

(52) U.S. Cl.
CPC ............ *H04L 47/125* (2013.01); *H04L 47/11* (2013.01); *H04L 47/22* (2013.01); *H04N 21/23655* (2013.01)

(58) Field of Classification Search
CPC ....... H04L 47/125; H04L 47/11; H04L 47/22; H04N 21/23655; H04N 21/2385; H04N 21/238; H04N 21/23; H04N 21/6168; H04N 21/24; H04N 21/2402; H04N 21/2662; H04N 21/266; H04N 21/437; H04N 21/43; H04N 21/442; H04N 21/6118;
(Continued)

(56) References Cited

U.S. PATENT DOCUMENTS

| 2006/0095943 A1* | 5/2006 | Demircin | H04N 21/2365 725/81 |
| 2013/0007226 A1* | 1/2013 | White | H04L 65/4076 709/219 |

(Continued)

*Primary Examiner* — Jeffrey M Rutkowski
*Assistant Examiner* — Luna Weissberger

(57) ABSTRACT

A Multicast Adaptive Bitrate (MABR) Bandwidth Control Agent (BCA) configured to manage bandwidth of a plurality of MABR data streams in an Internet Protocol Television (IPTV) over Data Over Cable Service Interface Specification (DOCSIS) system, wherein a bandwidth bottleneck exists on either an inbound, IP-network side of a Cable Modem Termination System (CMTS) or on an outbound, DOCSIS/RF-network side of the CMTS. The MABR BCA configures multiple virtual pipes on the inbound, IP-network side of the CMTS when the bottleneck is on the outbound, DOCSIS/RF-network side of the CMTS. One virtual pipe is configured for each service group to manage the bandwidth per service group for output RF ports on the CMTS. When the bottleneck is on the inbound, IP-network side of the CMTS, the MABR BCA configures one virtual pipe on the inbound, IP-network side to manage the bandwidth for input Ethernet ports on the CMTS.

20 Claims, 25 Drawing Sheets

(51) Int. Cl.
*H04L 12/815* (2013.01)
*H04N 21/2365* (2011.01)

(58) Field of Classification Search
CPC ...... H04N 21/615; H04N 21/61; H04N 21/60;
H04N 21/6373; H04N 21/632; H04N
21/6405; H04N 21/64; H04N 21/64738;
H04N 21/64723; H04N 21/64769; H04N
21/64761; H04N 21/64746; H04N
21/647; H04N 21/63; H04N 21/20
USPC ........................................................ 370/235
See application file for complete search history.

(56) References Cited

U.S. PATENT DOCUMENTS

| | | |
|---|---|---|
| 2013/0227625 A1 | 8/2013 | Forsman et al. |
| 2015/0288617 A1 | 10/2015 | Dasher et al. |
| 2015/0288732 A1* | 10/2015 | Phillips ................ H04L 65/60 709/219 |
| 2016/0073146 A1 | 3/2016 | Phillips et al. |
| 2016/0286247 A1 | 9/2016 | Phillips et al. |
| 2016/0286248 A1 | 9/2016 | Phillips et al. |
| 2016/0286249 A1 | 9/2016 | Phillips et al. |
| 2017/0181038 A1* | 6/2017 | Yeddala ................ H04W 28/20 |

* cited by examiner

BANDWIDTH MANAGEMENT OF MULTICAST ADAPTIVE BITRATE (MABR) DATA STREAMS IN AN IPTV-OVER-DOCSIS SYSTEM

CROSS-REFERENCE TO RELATED APPLICATIONS

This application claims the priority benefit under 35 U.S.C. § 119(e) of U.S. Provisional Application No. 62/450,252 filed on Jan. 25, 2017, the disclosure of which is incorporated herein by reference in its entirety.

TECHNICAL FIELD

The present disclosure relates to communication systems, and more particularly to a system and method for managing bandwidth of Multicast Adaptive Bitrate (MABR) data streams when delivering Internet Protocol Television (IPTV) over a Data Over Cable Service Interface Specification (DOCSIS) system.

BACKGROUND

DOCSIS is an international standard for adding high bandwidth data transfer to existing cable television systems. Recent changes in the DOCSIS specifications have increased the spectrum, allowing much higher bandwidth to be achieved in a DOCSIS system. As a result, many cable operators are exploring and deploying IPTV-over-DOCSIS systems enabling an enhanced end-user experience for television as compared to the traditional cable television experience. In addition, Adaptive Bitrate (ABR) technologies are being explored, and the CableLabs forum has created Multicast ABR specifications for Multicast ABR over Cable.

Ericsson has performed extensive research and development in the fields of MABR delivery, bandwidth management, policy management, and Quality of Experience (QoE) in both a traditional switched cable environment and an IPTV-over-DSL (Digital Subscriber Line) environment. DOCSIS has been referenced in that research, but by the nature of cable systems, the DSL systems and methods primarily utilized in that research are not optimal in an IPTV-over-DOCSIS environment. The management of bandwidth for MABR is vastly different in an IPTV-over-DOCSIS environment than in a DSL environment.

SUMMARY

Current working groups discussing MABR as a distribution and delivery means are not addressing the management of MABR bandwidth and QoE in DOCSIS networks. The present disclosure provides a system and method for managing bandwidth of MABR data streams in an IPTV-over-DOCSIS environment.

The present disclosure covers two different forms of transmission for the MABR data streams. In a first embodiment, the disclosed system uses a customer transmitter to deliver a gapped transmission of MABR segments providing the ability for a customer to leave an existing stream and join a new stream without experiencing any video data loss. A second embodiment uses only a receiver, which provides the ability for a customer to join an "old" MABR data stream and a simultaneous "new" MABR data stream for a brief duration until a Stream Access Point (SAP) is received. Once a SAP is received, the "old" stream is left.

The disclosed system may utilize MP2TS streams containing video, audio, and any additional data streams such as closed caption (CC) information, SCTE 35/ad markers, and the like. The disclosed system may also be used in the transition of Ericsson's patented Common Mezzanine Formatted (CMZF) streams.

In one embodiment, the present disclosure is directed to a method of managing bandwidth of a plurality of Multicast Adaptive Bitrate (MABR) data streams in an Internet Protocol Television (IPTV) over Data Over Cable Service Interface Specification (DOCSIS) system, wherein a bandwidth bottleneck exists on either an inbound, IP-network side of a Cable Modem Termination System (CMTS) or on an outbound, DOCSIS/RF-network side of the CMTS. The method includes configuring multiple virtual pipes on the inbound, IP-network side of the CMTS when the bottleneck is on the outbound, DOCSIS/RF-network side of the CMTS, wherein one virtual pipe is configured for each service group to manage the bandwidth per service group for output RF ports on the CMTS. When the bottleneck is on the inbound, IP-network side of the CMTS, the method includes configuring one virtual pipe on the inbound, IP-network side to manage the bandwidth for input Ethernet ports on the CMTS.

In another embodiment, the present disclosure is directed to a MABR BCA configured to manage bandwidth of a plurality of MABR data streams in an IPTV-over-DOCSIS system, wherein a bandwidth bottleneck exists on either an inbound, IP-network side of a CMTS or on an outbound, DOCSIS/RF-network side of the CMTS. The MABR BCA includes a processing circuit and a non-transitory memory that stores computer readable program code. When the processing circuit executes the computer readable program code, the MABR BCA is caused to configure multiple virtual pipes on the inbound, IP-network side when the bottleneck is on the outbound, DOCSIS/RF-network side of the CMTS, wherein one virtual pipe is configured for each service group to manage the bandwidth per service group for output RF ports on the CMTS. When the bottleneck is on the inbound, IP-network side of the CMTS, the MABR BCA is caused to configure one virtual pipe on the inbound, IP-network side to manage the bandwidth for input Ethernet ports on the CMTS.

In another embodiment, the present disclosure is directed to an architecture for managing bandwidth of a plurality of MABR data streams in an IPTV-over-DOCSIS system, wherein a bandwidth bottleneck exists on either an inbound, IP-network side of a CMTS or on an outbound, DOCSIS/RF-network side of the CMTS. The architecture includes a multicast sender configured to receive Adaptive Bitrate (ABR) encoded data streams and retransmit MABR gapped data streams comprising discrete video segments separated by gaps produced by burst-transmitting each segment at a higher data rate than an associated stream's encoded data rate; and a MABR BCA configured to receive the gapped MABR data streams, perform Leave and Join operations, remove the gaps, define one or more virtual pipes, and retransmit the data streams through the IP network to the CMTS. The MABR BCA includes a processing circuit and a non-transitory memory that stores computer readable program code. When the processing circuit executes the computer readable program code, the MABR BCA is caused to configure multiple virtual pipes on the inbound, IP-network side of the CMTS when the bottleneck is on the outbound, DOCSIS/RF-network side of the CMTS, wherein one virtual pipe is configured for each service group to manage the bandwidth per service group for output RF ports on the CMTS. When the bottleneck is on the inbound, IP-network side of the CMTS, the MABR BCA is caused to configure one virtual pipe on the inbound, IP-network side of the CMTS to manage the bandwidth for input Ethernet ports on the CMTS.

In another embodiment, the present disclosure is directed to an architecture for managing bandwidth of a plurality of MABR data streams in an IPTV-over-DOCSIS system, wherein a bandwidth bottleneck exists on either an inbound, IP-network side of a CMTS or on an outbound, DOCSIS/RF-network side of the CMTS. The architecture includes a multicast sender configured to receive ABR encoded data streams and retransmit MABR data streams, wherein each MABR data stream is non-gapped and includes data from a different multicast address and each data stream is encoded at a different bit rate; and a MABR BCA configured to receive the gapped MABR data streams, perform Leave and Join operations, remove the gaps, define one or more virtual pipes, and retransmit the data streams through the IP network to the CMTS. The MABR BCA includes a processing circuit and a non-transitory memory that stores computer readable program code. When the processing circuit executes the computer readable program code, the MABR BCA is caused to configure multiple virtual pipes on the inbound, IP-network side of the CMTS when the bottleneck is on the outbound, DOCSIS/RF-network side of the CMTS, wherein one virtual pipe is configured for each service group to manage the bandwidth per service group for output RF ports on the CMTS. When the bottleneck is on the inbound, IP-network side of the CMTS, the MABR BCA is caused to configure one virtual pipe on the inbound, IP-network side of the CMTS to manage the bandwidth for input Ethernet ports on the CMTS.

The disclosed system offers cable operators with the ability to offer many more channels inside the bandwidth allocation for the managed video delivery for IPTV-over-DOCSIS services. In addition, the handling of the CMZF formatted streams overcomes both the format and encryption schemes used across all types of video devices consuming the MABR content within the home.

The disclosed system provides an improved ability to manage bandwidth used in a fixed network pipe to a home with a focus on the ability to manage QoE across Over-the-Top (OTT) providers as well as multiple devices in the home watching content.

Further features and benefits of embodiments of the present disclosure will become apparent from the detailed description below.

BRIEF DESCRIPTION OF THE DRAWINGS

The accompanying drawings are incorporated into and form a part of the specification to illustrate one or more exemplary embodiments of the present disclosure. Various advantages and features of the disclosure will be understood from the following Detailed Description taken in connection and with reference to the attached drawing Figures in which.

DETAILED DESCRIPTION

In the following description, numerous specific details are set forth with respect to one or more embodiments of the present patent disclosure. However, it should be understood that one or more embodiments may be practiced without such specific details. In other instances, well-known circuits, subsystems, components, structures, and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

One or more embodiments of the present disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Figure 1:
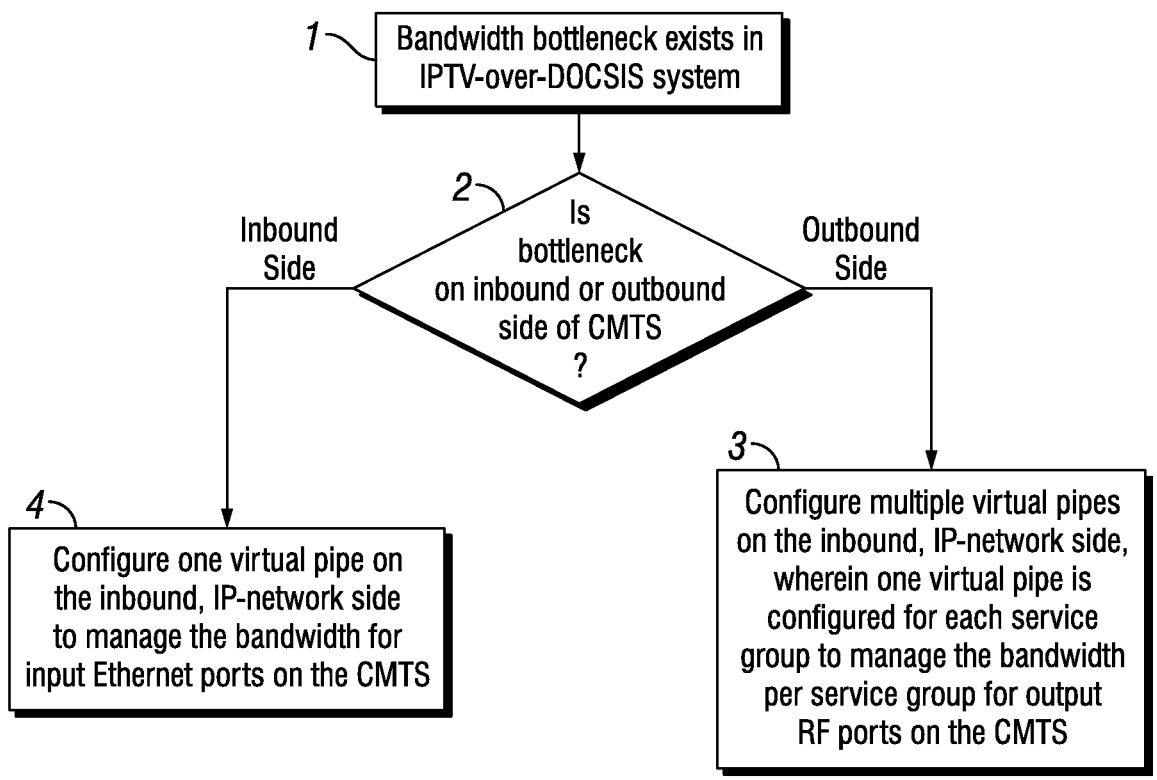
FIG. 1 is a flow chart illustrating the steps of an exemplary embodiment of an overall method of the present disclosure.

FIG. 1 is a flow chart illustrating the steps of an exemplary embodiment of an overall method of the present disclosure. In an IPTV-over-DOCSIS environment, a bandwidth bottleneck may develop on either the inbound side of the Cable Modem Termination System (CMTS) (limiting the bandwidth and restricting the number of MC streams the CMTS can join) or on the outbound side (causing a service group bandwidth problem). At step 1, it is noted that a bandwidth bottleneck exists on either the inbound side or the outbound side of the CMTS. At step 2, if the bottleneck is determined to be on the outbound side (i.e., RF ports), the method moves to step 3 where multiple virtual pipes are configured on the inbound, IP-network side. One virtual pipe is configured for each service group to manage the bandwidth per service group for output RF ports on the CMTS. This is shown below in more detail in FIGS. 2 and 7. The size of the virtual pipe is the same as the RF side physical pipe as defined through channel bonding/QAM grouping for the MABR delivery pipe. If the bottleneck is determined to be on the inbound side of the CMTS, the method moves to step 4 where one virtual pipe is configured on the inbound, IP-network side to manage the bandwidth for input Ethernet ports on the CMTS. This is shown below in more detail in FIGS. 3 and 8.

Figure 2:
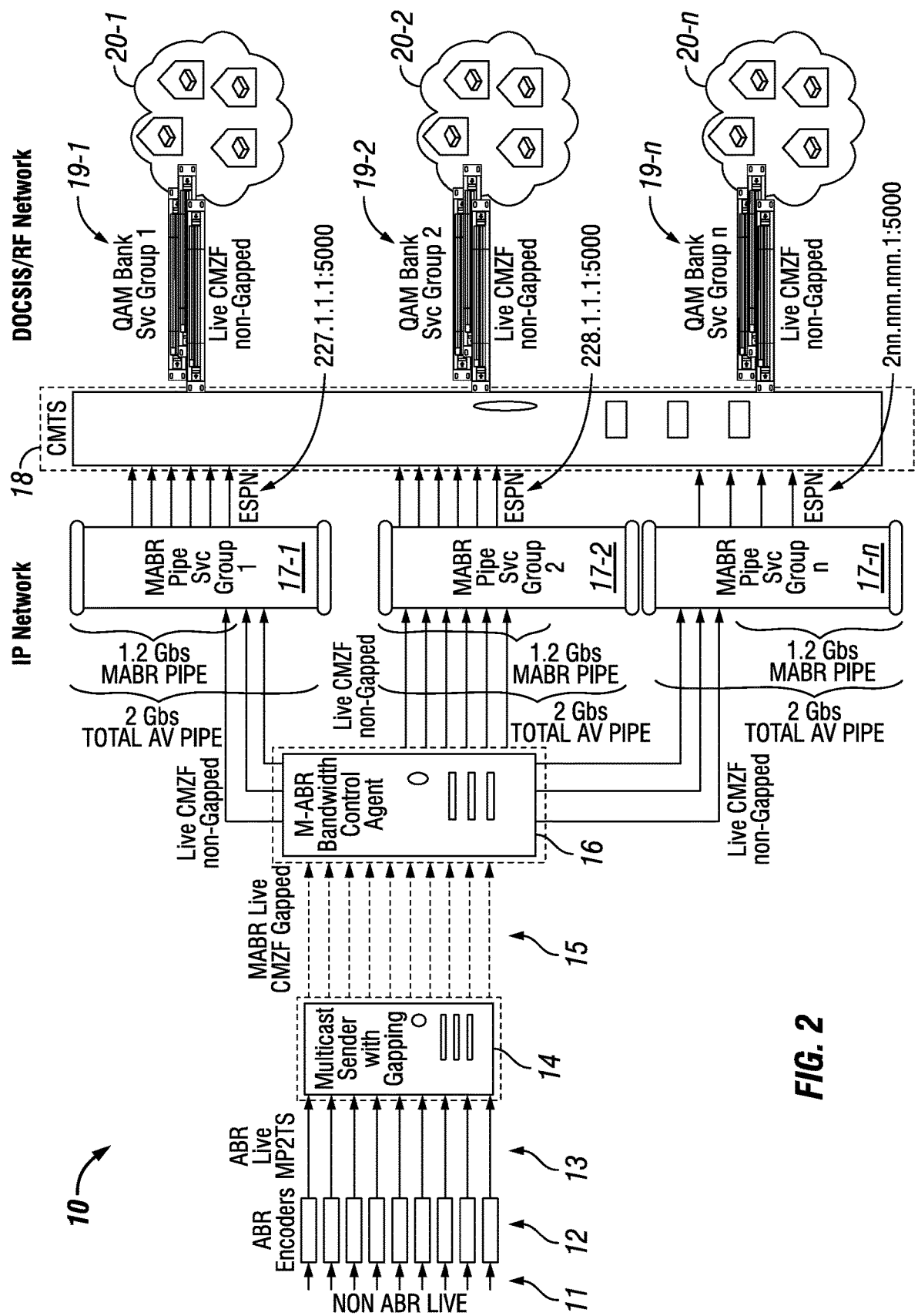
FIG. 2 is a simplified block diagram illustrating an exemplary embodiment of a system architecture in a cable system for MABR bandwidth management using gapped segment transmission when a bandwidth bottleneck is experienced on the DOCSIS/RF (outbound) side of the CMTS.

FIG. 2 is a simplified block diagram illustrating an exemplary embodiment of a system architecture 10 in a cable system for MABR bandwidth management using gapped segment transmission when a bandwidth bottleneck is experienced on the DOCSIS/RF (outbound) side of the CMTS 18. A plurality of non-ABR live data streams 11 are encoded by ABR encoders 12 to produce ABR live MP2TS data streams 13. A Multicast Sender 14 with gapping and MC retransmission produces MABR live CMZF gapped streams 15. The Multicast Sender delivers video segments by burst-transmitting each segment at a slightly higher rate than the encoded bandwidth, which generates gaps between the segments. The gaps may be approximately 150-300 ms in length. The MABR live CMZF gapped streams are received by a MABR Bandwidth Control Agent (BCA) 16. The gaps generate enough pause to allow the MABR BCA enough time to leave one multicast address and join another multicast address.

In FIG. 2, each service is assigned a group of multicast addresses to be multicast across a core network. A service is assigned multiple multicast (MC) addresses within the grouping to be transmitted where there is a service bit rate mapping per multicast address. The MABR BCA 16 configures multiple MABR virtual pipes 17-1 through 17-$n$. One virtual pipe is defined per service group, where the size of the virtual pipe is the same as the physical pipe as defined through channel bonding/Quadrature Amplitude Modulation (QAM) grouping for the MABR delivery pipe. The CMTS 18 receives the data streams in each virtual pipe and provides live CMZF non-gapped streams 19-1 through 19-$n$ in a DOCSIS network to each QAM bank service group and destination premises 20-1 through 20-$n$. The Multicast Sender 14 with gapping and MC retransmission and the MABR BCA 16 are described in further detail below.

Since the bandwidth must be controlled across multiple service groups on the input side of the MABR BCA 16, there are multiple MC addresses per service, where each MC address is for a different bitrate for a service. The outbound side of the virtual pipe is a single MC stream 19-1 through 19-$n$ per service. Since bitrates are controlled per service on a service group level, multiple MC addresses must be joined per service depending on the saturation of the pipes per service group. On the IP-network side, the CMTS can only join one MC address per service. This limitation forces MC addresses for services to be unique across service groups. In FIG. 2, for example, ESPN for service group 1 is shown to be 227.1.1.1:5000; for service group 2, ESPN is 228.1.1.1:5000; and for service group n, ESPN is 2nn.nnn.nnn.1:5000. In this configuration, the system can deliver different bitrates of the same service to the service groups based on the saturation of the pipe per service group.

Figure 3:
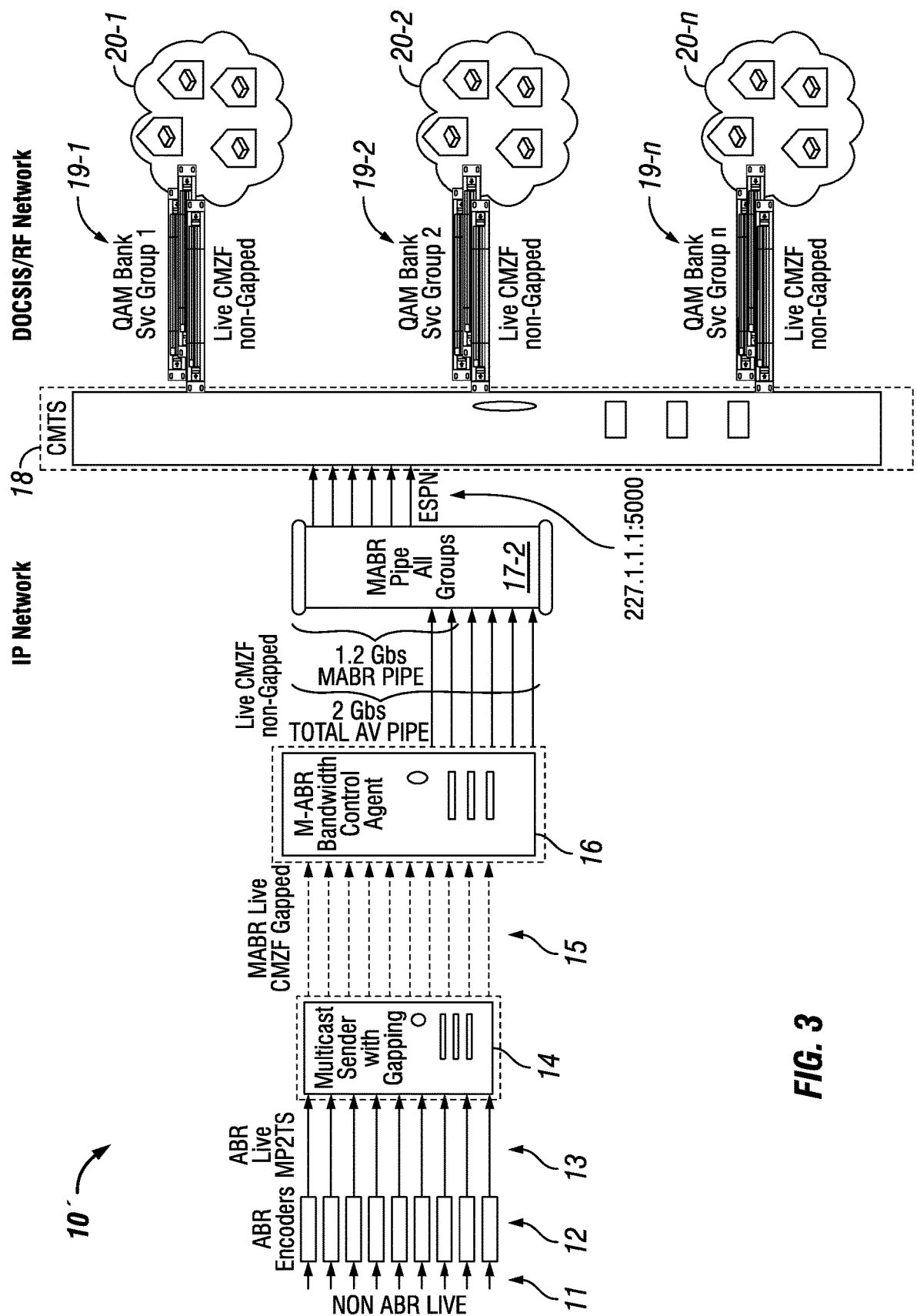
FIG. 3 is a simplified block diagram illustrating an exemplary embodiment of a system architecture in a cable system for MABR bandwidth management using gapped segment transmission when a bandwidth bottleneck is experienced on the IP network (inbound) side of the CMTS.

FIG. 3 is a simplified block diagram illustrating an exemplary embodiment of a system architecture 10' in a cable system for MABR bandwidth management using gapped segment transmission when a bandwidth bottleneck is experienced on the IP network (inbound) side of the CMTS. When IP (Ethernet ports) bandwidth is the limiting factor, the MABR BCA is configured with a single virtual pipe defined. In this case, the pipe is configured to prevent the inbound/IP side of the CMTS to be controlled. All service groups receive a common bitrate per service.

Since the bandwidth is the same across all service groups on the input side of the MABR BCA 16, as in FIG. 2, there are multiple MC addresses per service where each MC address will be for a different bitrate for a service. The outbound side of the virtual pipe is a single MC stream per service. This single MC stream as a chosen bitrate is delivered to all service groups, so there is no need for multiple MC addresses per service.

Figure 4A:
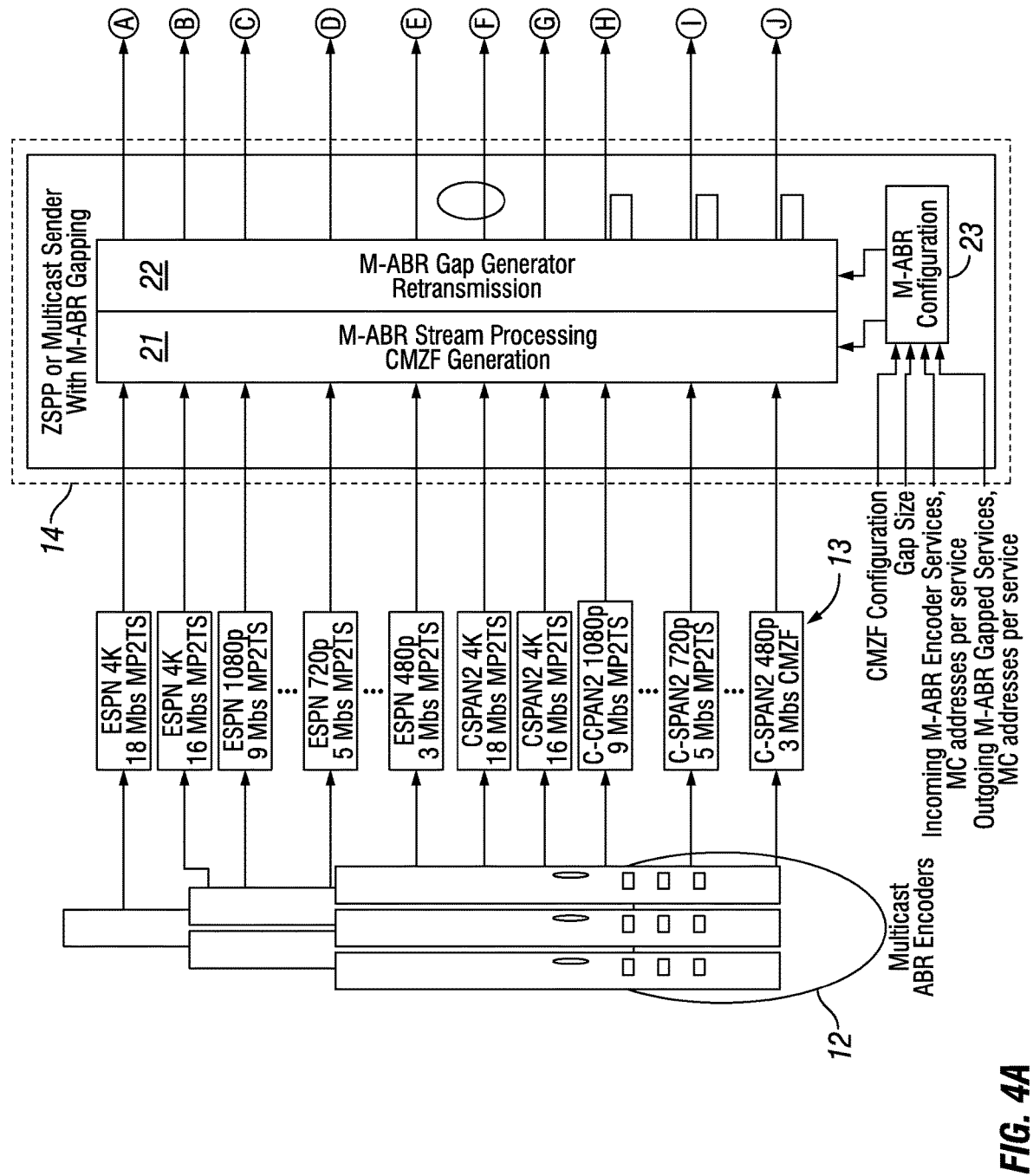
FIGS. 4A-4B are portions of a simplified block diagram illustrating an exemplary embodiment of the Multicast Sender with Multicast Gapping and Retransmission system using Common Mezzanine Formatted (CMZF) generation and gapped segment retransmission.
Figure 4B:
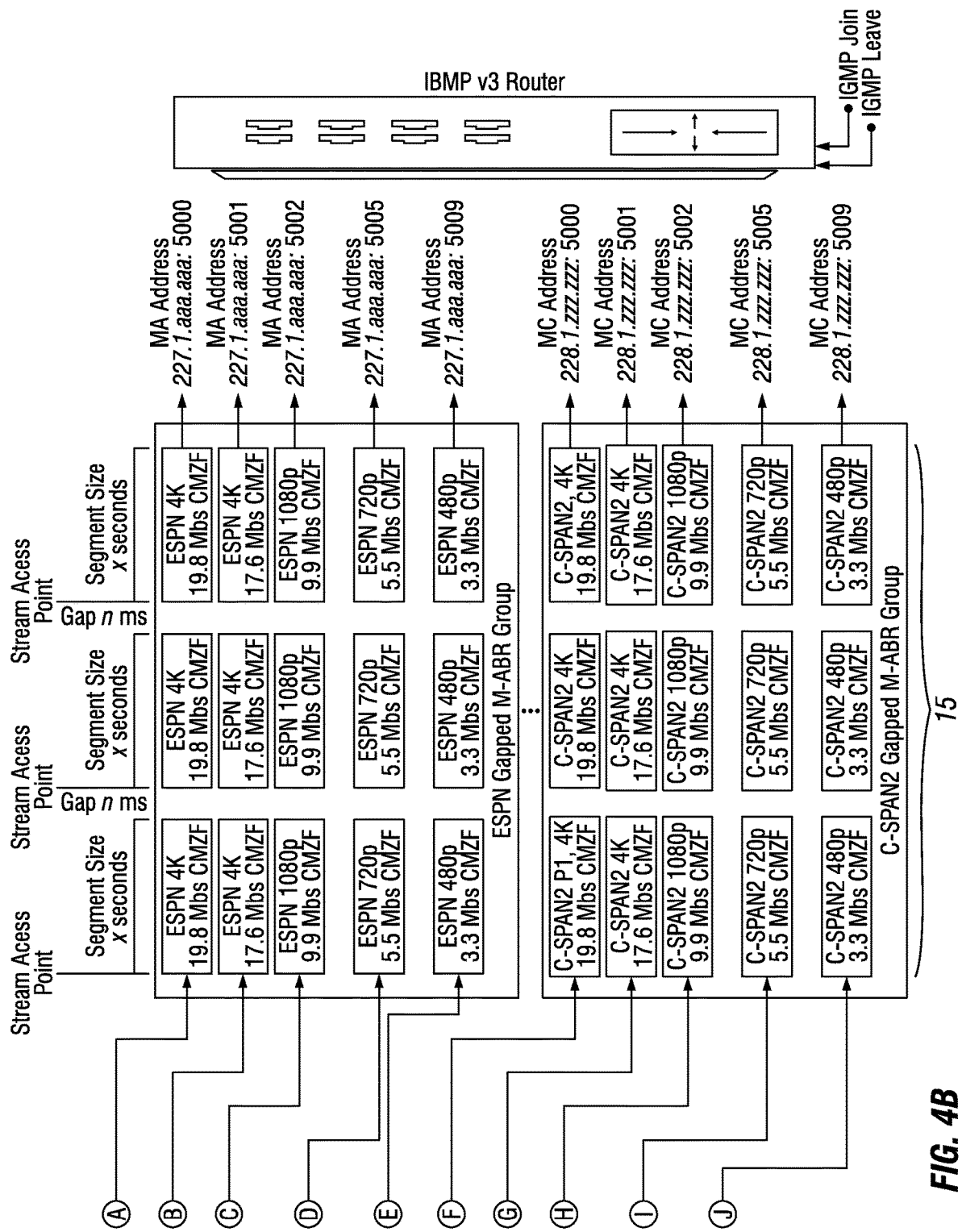

FIGS. 4A-4B are portions of a simplified block diagram illustrating an exemplary embodiment of the Multicast Sender 14 using Common Mezzanine Formatted (CMZF) generation and gapped segment transmission. Referring to FIG. 4A, the live ABR encoders 12 produce multiple MP2TS data streams 13. The Multicast Sender 14 is configured to join multiple multicast addresses delivered from the live ABR encoders. Each of the ABR services from the encoder is delivered on multiple multicast addresses and each multicast address may have a different bit rate.

The Multicast Sender 14 includes a MABR Stream Processing CMZF generator 21, a MABR Gap Generator 22, and a MABR configuration unit 23. The MABR configuration unit receives as inputs (1) a CMZF configuration to properly generate the CMZF, (2) the desired gap size defined in milliseconds, (3) incoming MABR Encoder Services and multicast addresses per service as well as the bit rate of the stream encoding (however this may be calculated), and (4) outgoing MABR gapped services and MC addresses per service to define the multicast addresses for re-transmitting the gapped services segments. This functionality can be applied for any stream where Stream Access Points can be identified and there are time stamps across all streams in an ABR grouping per services.

The MABR configuration unit 23 provides the CMZF configuration to the MABR Stream Processing CMZF generator 21, which converts the MP2TS streams 13 into the CMZF format. The advantage of the CMZF format is that it provides a common encryption and conversion to the proper container formats allowing greater device coverage. The MABR configuration unit 23 also provides the desired gap size to the MABR Gap Generator 22.

Referring to FIG. 4B, the MABR Gap Generator 22 burst transmits each of the CMZF segments at a slightly higher bit rate than the encoded bit rate, creating the MABR live CMZF gapped streams 15 with the 150-300 ms gaps as defined in the gap size.

Figure 5A:
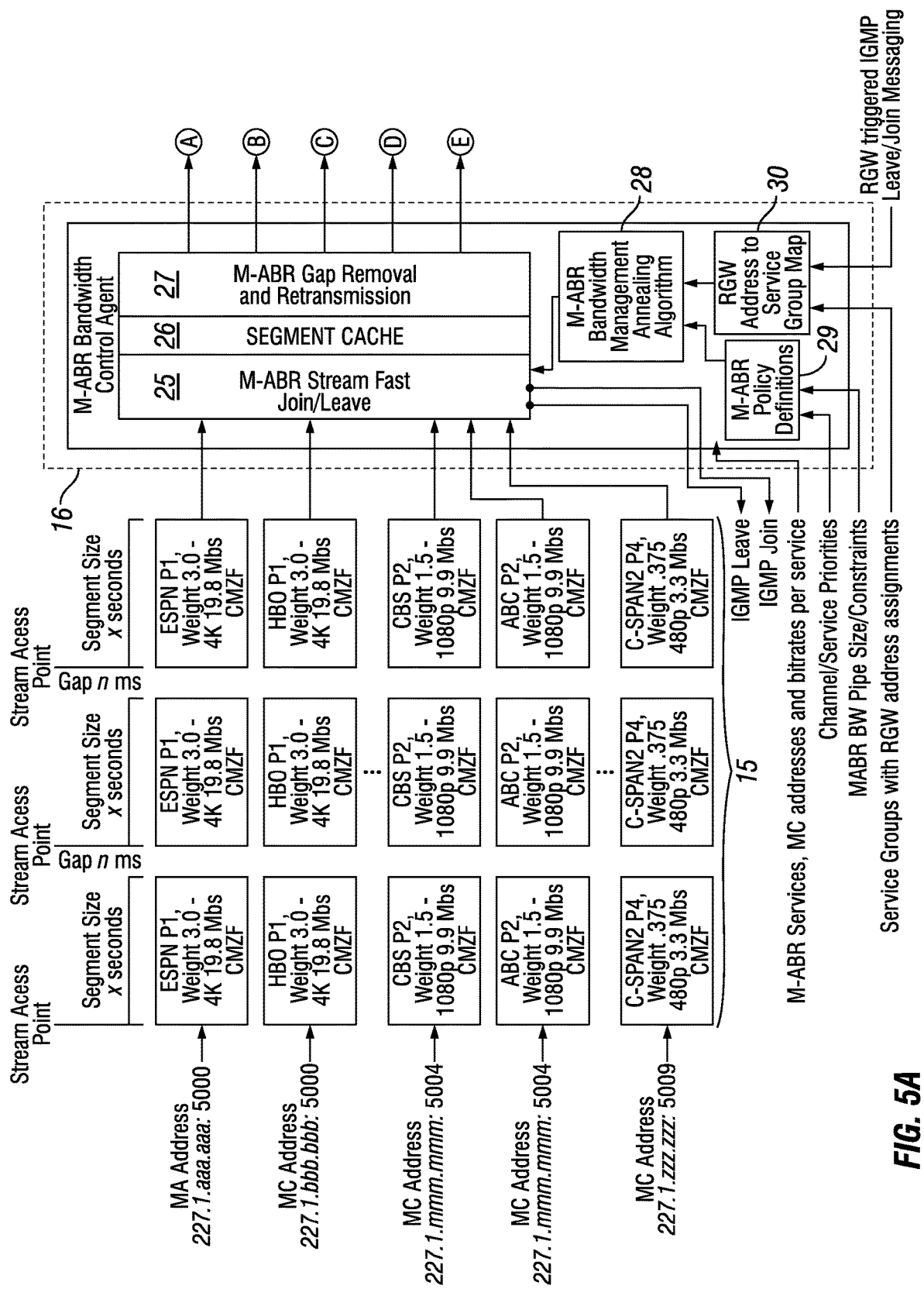
FIGS. 5A-5B are portions of a simplified block diagram illustrating an exemplary embodiment of the MABR Bandwidth Control Agent system with gap removal and retransmission.
Figure 5B:
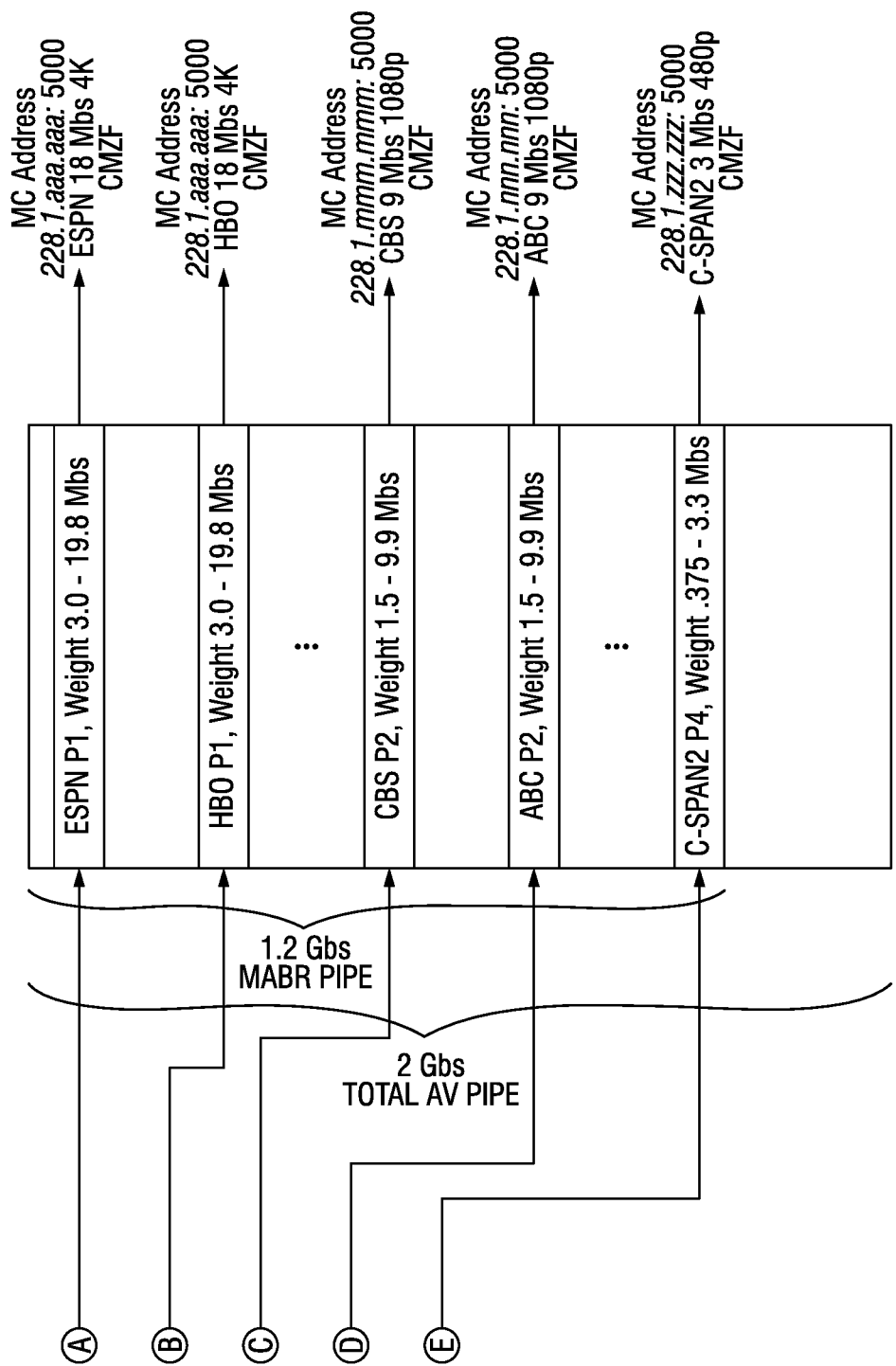

FIGS. 5A-5B are portions of a simplified block diagram illustrating an exemplary embodiment of the MABR Bandwidth Control Agent (BCA) 16 with gapped segment transmission. Referring to FIG. 5A, the MABR BCA is configured to join one of the multicast transmissions per service, and includes a MABR Stream Fast Join/Leave unit 25, a small segment cache 26, and a MABR Gap Removal and Retransmission unit 27. The determination of the proper multicast address to join is determined by a MABR Bandwidth Management Annealing Algorithm 28. The small segment cache 26 temporarily stores video segment data to enable the MABR Gap Removal and Retransmission unit to remove the gaps, properly switch multicast addresses based on a required bandwidth change, perform any required processing, and smoothly transition from delivering the incoming stream from one MC address to a different incoming multicast address. Although FIG. 5A illustrates CMZF streams incoming, it should be noted that the MABR BCA has the ability to process other types of input stream formats such as MPEG2TS streams containing video and audio, data, MP4 multiplexed segments embedded in MPEG2TS streams, and the like.

Configuration inputs to the MABR BCA 16 include (1) MABR services, MC addresses, and bitrates per service (alternatively, bit rates may be calculated); and (2) Residential Gateway (RGW)-triggered IMGP Leave/Join messaging. In addition, Channel/Service Priorities for policy control per service, and MABR Bandwidth pipe size/constraints for each pipe per service group are provided to a MABR Policy Definitions unit 29, which provides inputs to the MABR Bandwidth Management Annealing Algorithm 28. Additionally, information regarding outbound service multicast address definitions/assignments for the delivery of the services to the homes (i.e., service groups with RGW assignments grouped into the proper service groups) is provided to a RGW Address to Service Group Map 30, which also provides input to the MABR Bandwidth Management Annealing Algorithm.

Referring to FIG. 5B, the output of the MABR BCA 16 is one service per one multicast address. The delivery is at the original encoded bit rate, and no gaps are delivered.

FIGS. 6A-6D are portions of a flow chart illustrating the steps of an exemplary embodiment of a method of managing MABR bandwidth in an IPTV-over-DOCSIS environment. The method manages the bandwidth of MABR services within the allocation of bandwidth per service group in the IPTV-over-DOCSIS environment using gapped transmission of segments. The method is similar to IPTV-over-DOCSIS, with the primary differences being managing a virtual pipe covering multiple RGWs and tracking the number of subscribers watching a service.

Figure 6A:
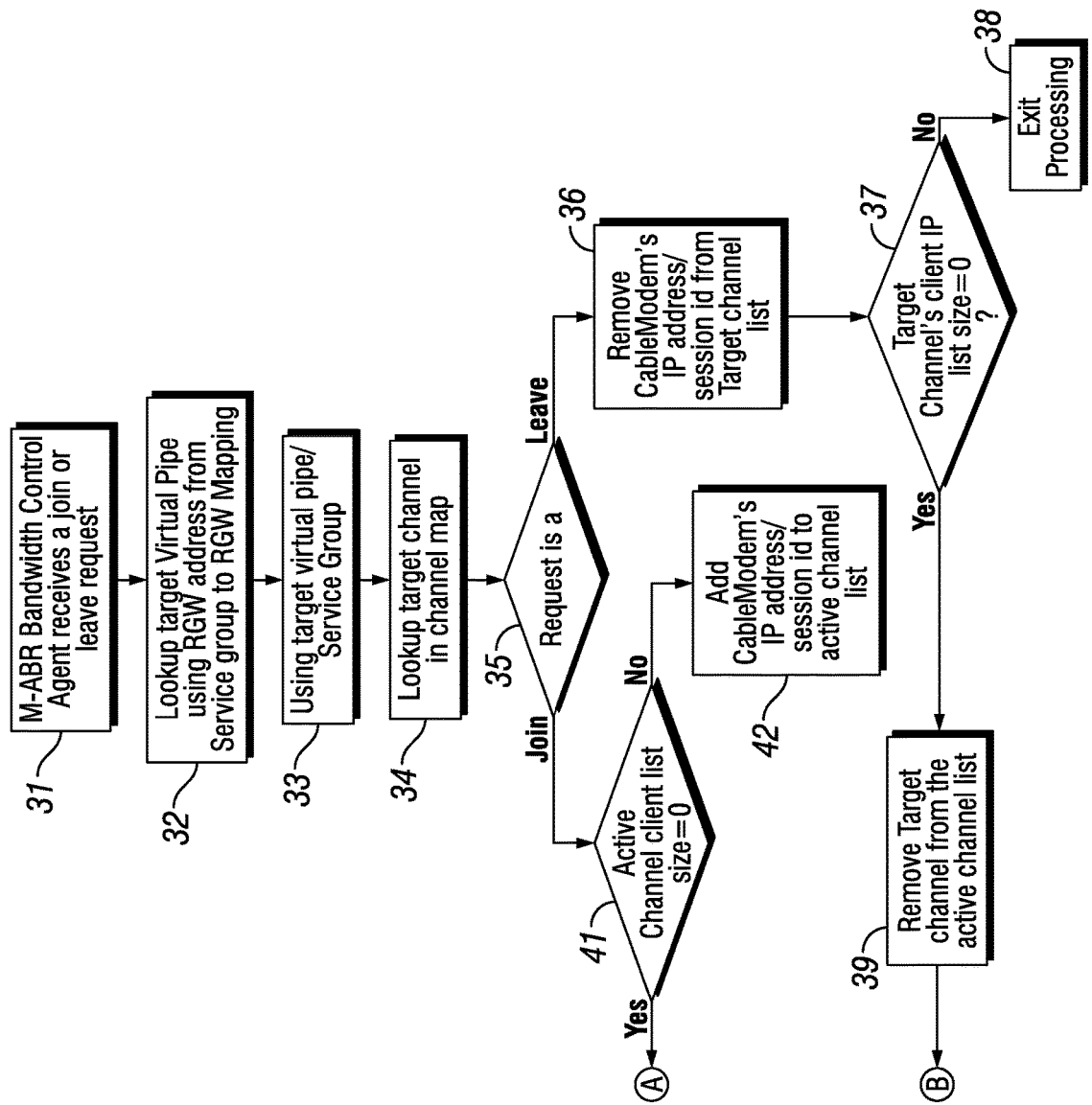
FIGS. 6A-6D are portions of a flow chart illustrating the steps of an exemplary embodiment of a method of managing MABR bandwidth in an IPTV-over-DOCSIS environment.

Referring first to FIG. 6A, at step 31, the MABR BCA 16 receives a Join or Leave request from a requesting client for a change in channels. At step 32, the MABR BCA looks up a target virtual pipe using a RGW IP address retrieved from the RGW Address to Service Group Map 30. At step 33, the MABR BCA obtains the target virtual pipe and associated service group and at step 34 looks up a target channel in a channel map. At step 35, it is determined whether the request is a Join or a Leave. When the request is a Leave, the method moves to step 36 where the MABR BCA removes the cable modem's IP address/session ID from a target channel list. At step 37, it is determined whether the target channel's client IP list size is equal to zero (0). If not, the method exits processing at step 38. When the target channel's client IP list size is equal to zero (0), the method moves to step 39 where the target channel is removed from the active channel list. The method then moves to step 45 of FIG. 6B.

However, when it is determined at step 35 that the request is a Join, the method moves to step 41 where it is determined whether the active channel client list size is equal to zero (0). If not, the method moves to step 42 where the cable modem's IP address/session ID is added to the active channel list. However, when the active channel client list size is equal to zero (0), the method moves instead to step 43 of FIG. 6B.

Figure 6B:
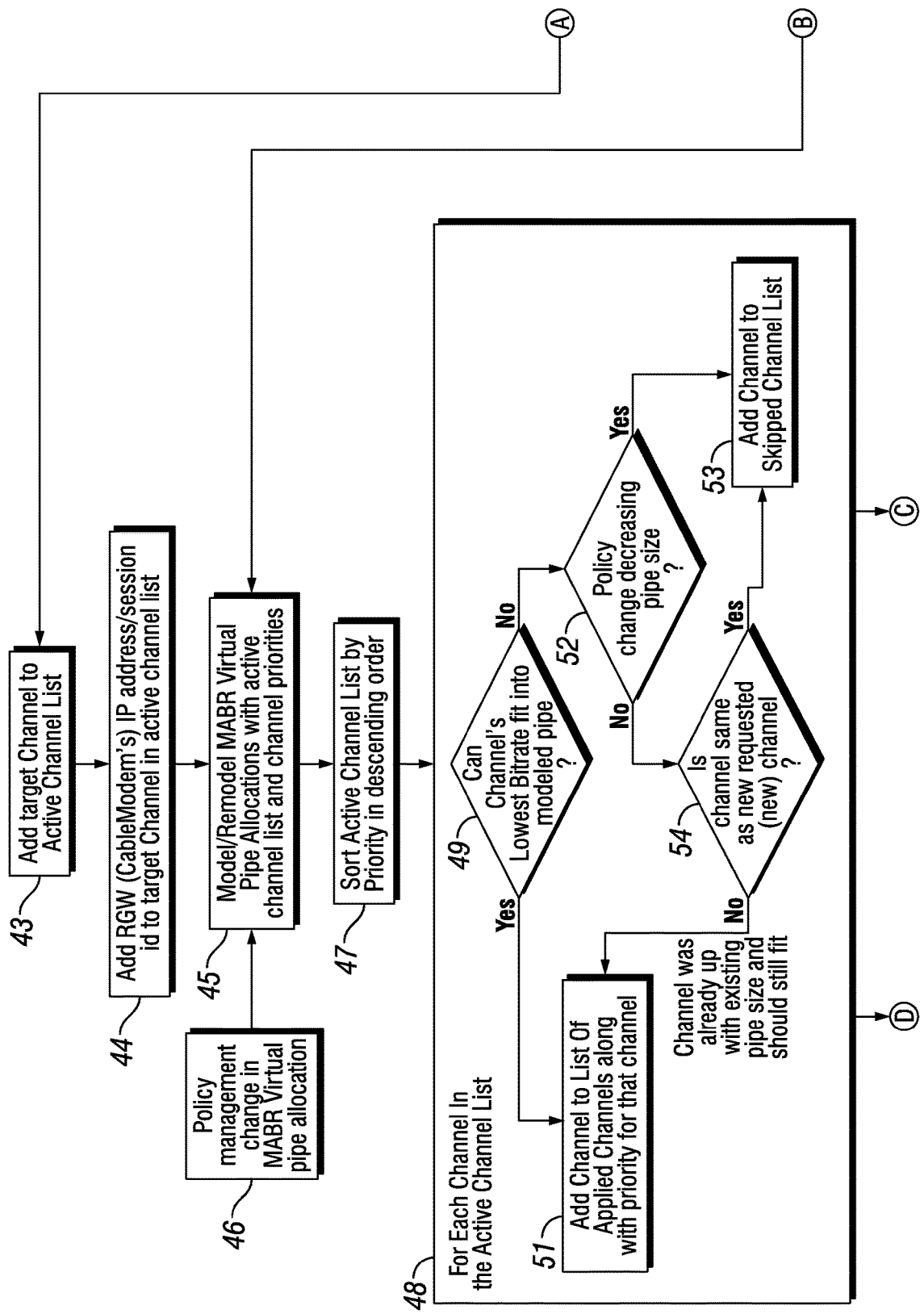

Referring now to FIG. 6B, when the request is a Join request, and the size of the active channel client list is zero (0), the method resumes at step 43 where the target channel is added to the active channel list. At step 44, the RGWs (cable modem's) IP address and session ID are added to the target channel in the active channel list. At step 45, the MABR virtual pipe allocations are modeled or remodeled with input at step 46 from a policy management change in channel priorities and the active channel list from step 44. At step 47, the active channel list is sorted by priority in descending order so that higher priority channels are considered first.

The method then performs process 48 for each channel in the active channel list. At step 49, it is determined whether the channel's lowest bitrate will fit into the modeled virtual pipe. When the channel's lowest bitrate will fit into the modeled pipe, the method moves to step 51 where the channel is added to a list of applied channels, along with the associated priority. However, when it is determined that the channel's lowest bitrate will not fit into the modeled pipe, the method moves instead to step 52 where it is determined whether there is a policy change decreasing the virtual pipe size. If so, the method moves to step 53 where the channel is added to a skipped channel list. When it is determined there is not a policy change decreasing the virtual pipe size, the method moves instead to step 54 where it is determined whether the channel is the same as a requested (new) channel. if so, the method returns to step 53 where the channel is added to the skipped channel list. When it is determined at step 54 that the channel is not the same as the requested (new) channel, it is concluded that the channel was already up with the existing virtual pipe size and should still fit. Therefore, the method moves to step 51 where the channel is added to the list of applied channels, along with the associated priority.

Figure 6C:
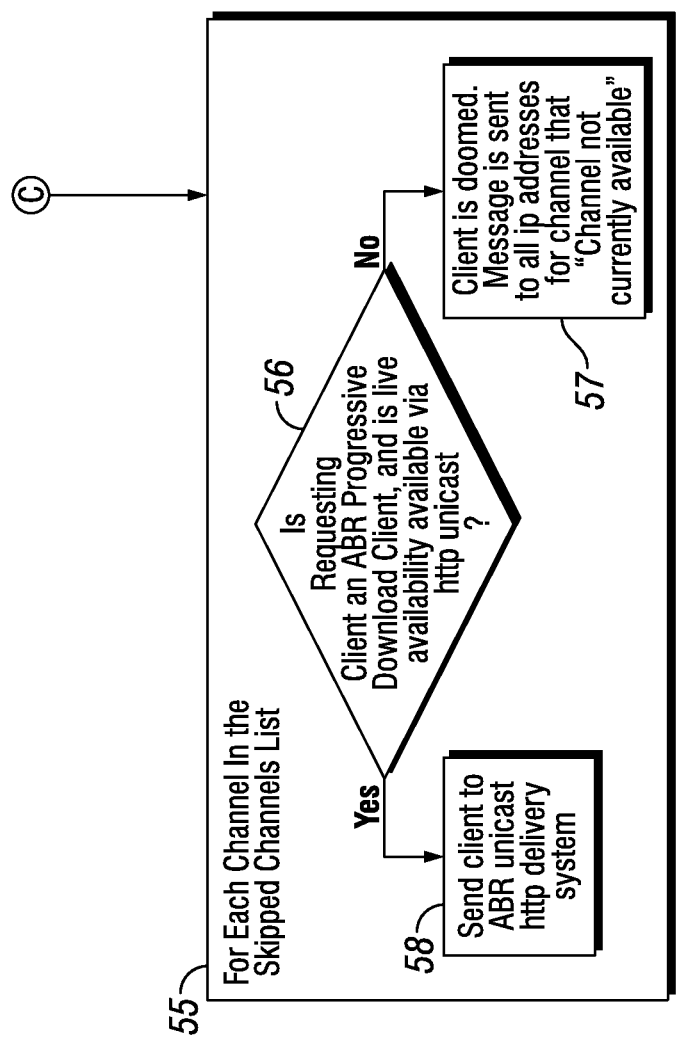

Referring now to FIG. 6C, following step 53 of FIG. 6B, for each channel in the skipped channel list, the method performs process 55. At step 56, it is determined whether the requesting client is an ABR progressive download client and whether live availability is available via http unicast. If not, the requesting client is doomed, and the method moves to step 57 where a message is sent to all IP addresses for the channel indicating the channel is not currently available. However, when, it is determined that the requesting client is an ABR progressive download client and live availability is available via http unicast, the method moves to step 58 where the requesting client is sent to an ABR http unicast delivery system.

Figure 6D:
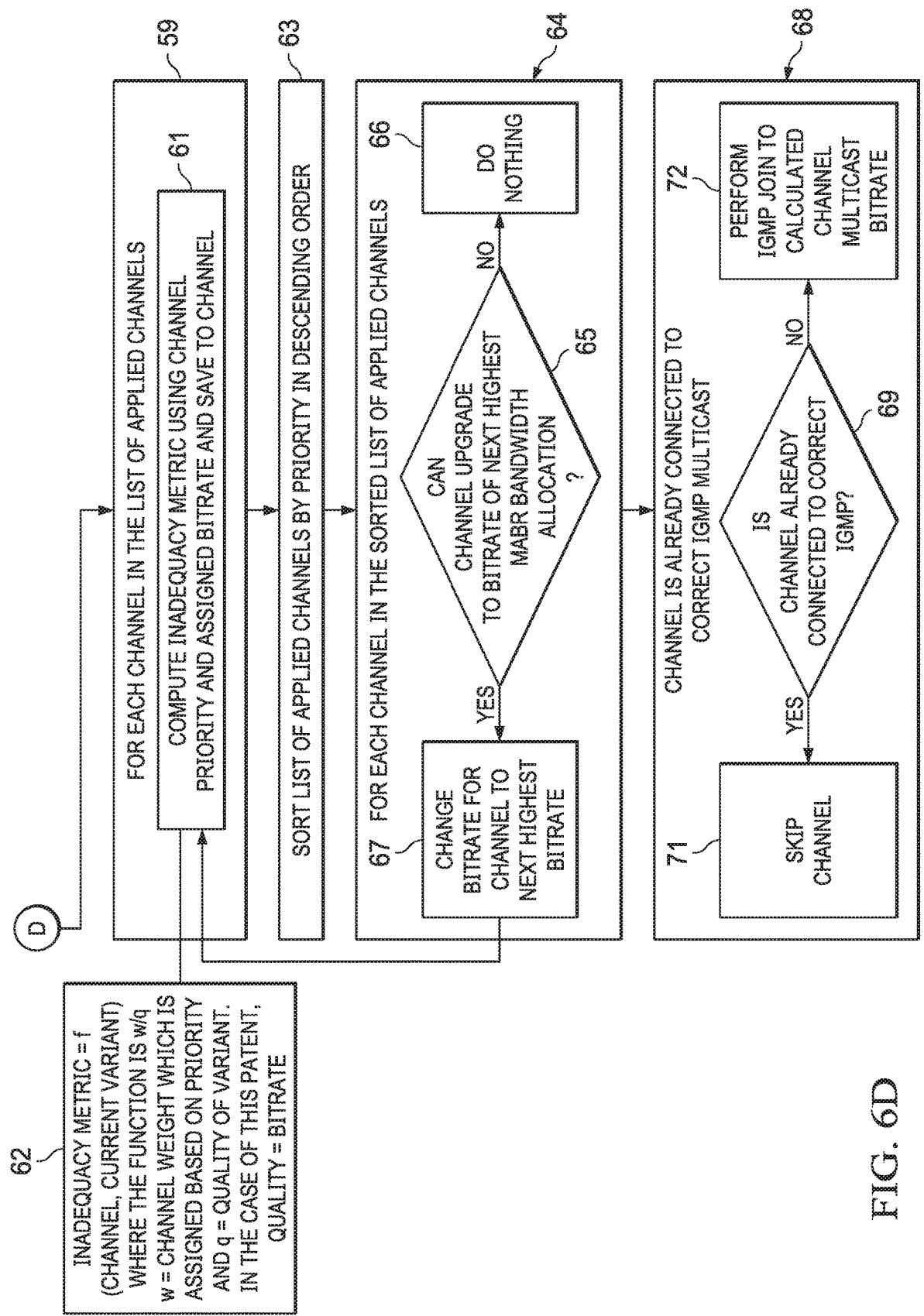

Referring now to FIG. 6D, following step 51 of FIG. 6B, for each channel in the list of applied channels, the method performs process 59. At step 61, an inadequacy metric is computed using the channel priority and the assigned bitrate, and this inadequacy metric is saved to the channel. The inadequacy metric is a measure of how far out of balance an allocation to a channel is with regard to its priority and the priority of the other channels. One example of determining the inadequacy metric is shown in example block 62, although other measures of an imbalance may be used in practicing the disclosed method. In the disclosed method, video channels are assigned weights, which reflect the share of bandwidth that should be given to each video channel, based on the channel's priority. For example, a priority 1 channel may have a weight of 3, a priority 2 channel a weight of 1.5, and a priority 3 channel a weight of 0.75. These weights indicate that the priority 1 channel will ideally receive twice as much bandwidth as the priority 2 channel and four times as much bandwidth as the priority 3 channel. In one embodiment, an inadequacy metric, f(channel, current variant), is calculated as the weight (w) associated with the priority of a channel divided by the quality (q) of the variant, in the case of the current disclosure, the bitrate allocated to the channel.

Once the inadequacy metric has been computed for each channel, the method moves to step 63 where the list of applied channels is sorted by inadequacy metric in descending order, so that the channel that is most out of balance is considered first. The method then performs process 64 for each channel in the sorted list of applied channels, taken in descending order. At step 65, it is determined whether the channel can be upgraded to the bitrate of the next highest MABR bandwidth allocation. When the channel cannot be upgraded to the bitrate of the next highest MABR bandwidth allocation, the method moves to step 66 where nothing is done for that channel. However, when the channel can be upgraded to the bitrate of the next highest MABR bandwidth allocation, the method moves instead to step 67 where the bitrate for the channel is changed to the next highest bitrate. The method then returns to process 59. In practice, since only one channel has a changed bitrate, it is necessary only to recalculate the inadequacy metric for the channel that has just been bumped to a new bitrate and to again sort the list of applied channels. This return to an earlier step is necessary because the channel that has just received a bump in bitrate may still be the furthest out of balance, e.g., if the channel receiving the bump is associated with a priority 1 channel policy while the other channels are priority 3.

Once process 64 has been completed, the method performs process 68. At step 69, it is determined whether the channel is already connected to the correct Internet Group Management Protocol (IGMP) multicast. If so, there is no need to change the connection and the stream is skipped at step 71. However, when the channel is not already connected to the correct IGMP multicast, the method moves to step 72 where the gateway leaves the existing channel multicast and performs an IGMP Join to the calculated channel multicast bitrate.

Figure 7:
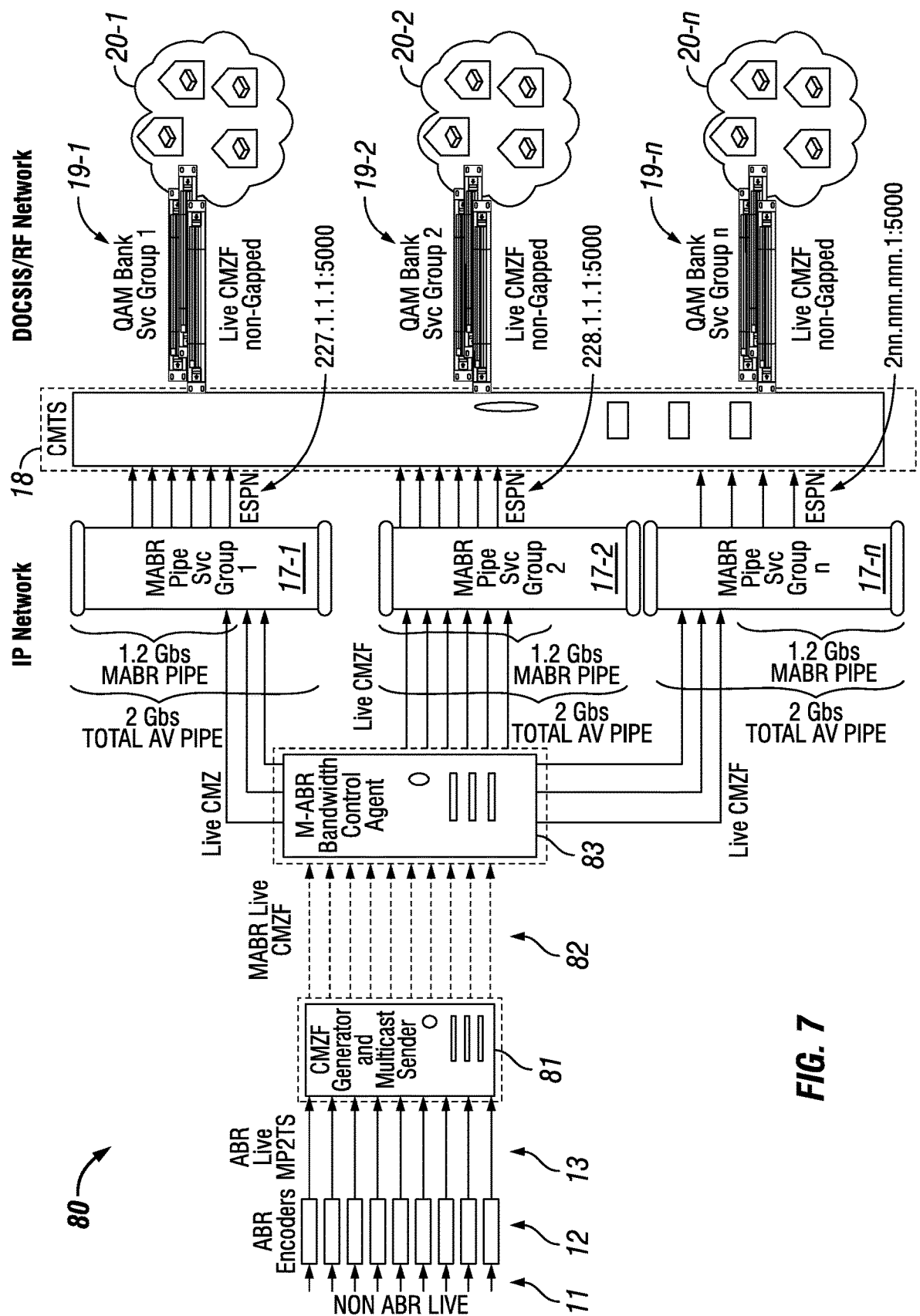
FIG. 7 is a simplified block diagram illustrating an exemplary embodiment of a system architecture in a cable system for MABR bandwidth management using non-gapped segment transmission when a bandwidth bottleneck is experienced on the DOCSIS/RF (outbound) side of the CMTS.

FIG. 7 is a simplified block diagram illustrating an exemplary embodiment of a system architecture 80 in a cable system for MABR bandwidth management using non-gapped segment transmission when a bandwidth bottleneck is experienced on the DOCSIS/RF (outbound) side of the CMTS.

Gapping requires a continuous transmission across the core network regardless of switching activity. By removing the gaps, a small amount of bandwidth can be reclaimed over the core network for a vast majority of the time. Any time switches do occur, there is a spike in core network usage as a result of joining two multicast streams in order to perform the media processing required to avoid the loss of media data while performing a multicast Leave/Join.

A plurality of non-ABR live data streams 11 are encoded by ABR encoders 12 to produce ABR live MP2TS data streams 13. A CMZF Generator and Multicast Sender 81 produces MABR live CMZF non-gapped streams 82. The MABR live CMZF non-gapped streams are received by a non-gapped MABR Bandwidth Control Agent (BCA) 83. Each service is assigned a group of multicast addresses to be multicast across a core network. A service is assigned multiple MC addresses within the grouping to be transmitted where there is a service bit rate mapping per multicast address. The non-gapped MABR BCA 83 allows multiple MABR virtual pipes 17-1 through 17-n to be defined. One virtual pipe is defined per service group, where the size of the virtual pipe is the same as the physical pipe as defined through channel bonding/QAM grouping for the MABR delivery pipe. The CMTS 18 receives the data streams in each virtual pipe and provides live CMZF non-gapped streams 19-1 through 19-n in the DOCSIS network to each QAM bank service group and destination premises 20-1 through 20-n.

The non-gapped MABR BCA 83 is similar to the MABR BCA 16 in the gapped embodiment of FIG. 2. However, there are differences in required media processing to achieve the same desired end result. The CMZF Generator and Multicast Sender 81 and the non-gapped MABR BCA 83 are described in further detail below.

Like in FIG. 2 above, the bandwidth must be controlled across multiple service groups on the input side of the MABR BCA 16. So there are multiple MC addresses per service, where each MC address is for a different bitrate for a service. The outbound side of the virtual pipe is a single MC stream 19-1 through 19-n per service. Since bitrates are controlled per service on a service group level, multiple MC addresses must be joined per service depending on the saturation of the pipes per service group. On the IP-network side, the CMTS can only join one MC address per service. This limitation forces MC addresses for services to be unique across service groups. In FIG. 7, for example, ESPN for service group 1 is shown to be 227.1.1.1:5000; for service group 2, ESPN is 228.1.1.1:5000; and for service group n, ESPN is 2nn.nnn.nnn.1:5000. In this configuration, the system can deliver different bitrates of the same service to the service groups based on the saturation of the pipe per service group.

Figure 8:
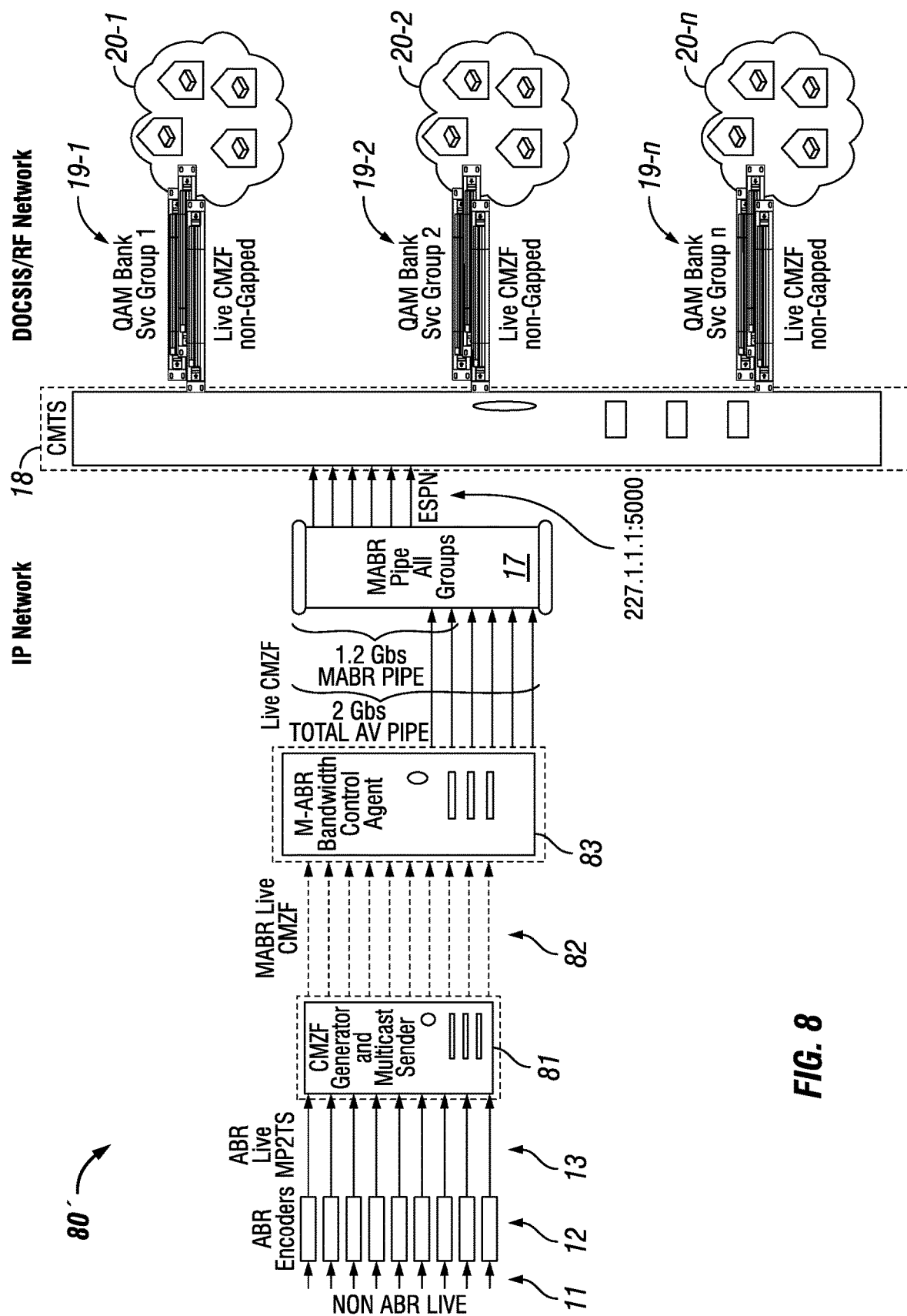
FIG. 8 is a simplified block diagram illustrating an exemplary embodiment of a system architecture in a cable system for MABR bandwidth management using non-gapped segment transmission when a bandwidth bottleneck is experienced on the IP network (inbound) side of the CMTS.

FIG. 8 is a simplified block diagram illustrating an exemplary embodiment of a system architecture 80' in a cable system for MABR bandwidth management using non-gapped segment transmission when a bandwidth bottleneck is experienced on the IP network (inbound) side of the CMTS. When IP (Ethernet ports) bandwidth is the limiting factor, the MABR BCA 83 is configured with a single virtual pipe defined. In this case, the pipe is configured to prevent the inbound/IP side of the CMTS to be controlled. All service groups receive a common bitrate per service.

Since the bandwidth is the same across all service groups on the input side of the MABR BCA, as in FIG. 7, there are multiple MC addresses per service where each MC address will be for a different bitrate for a service. The outbound side of the virtual pipe is a single MC stream per service. This single MC stream as a chosen bitrate is delivered to all service groups, so there is no need for multiple MC addresses per service.

Figure 9A:
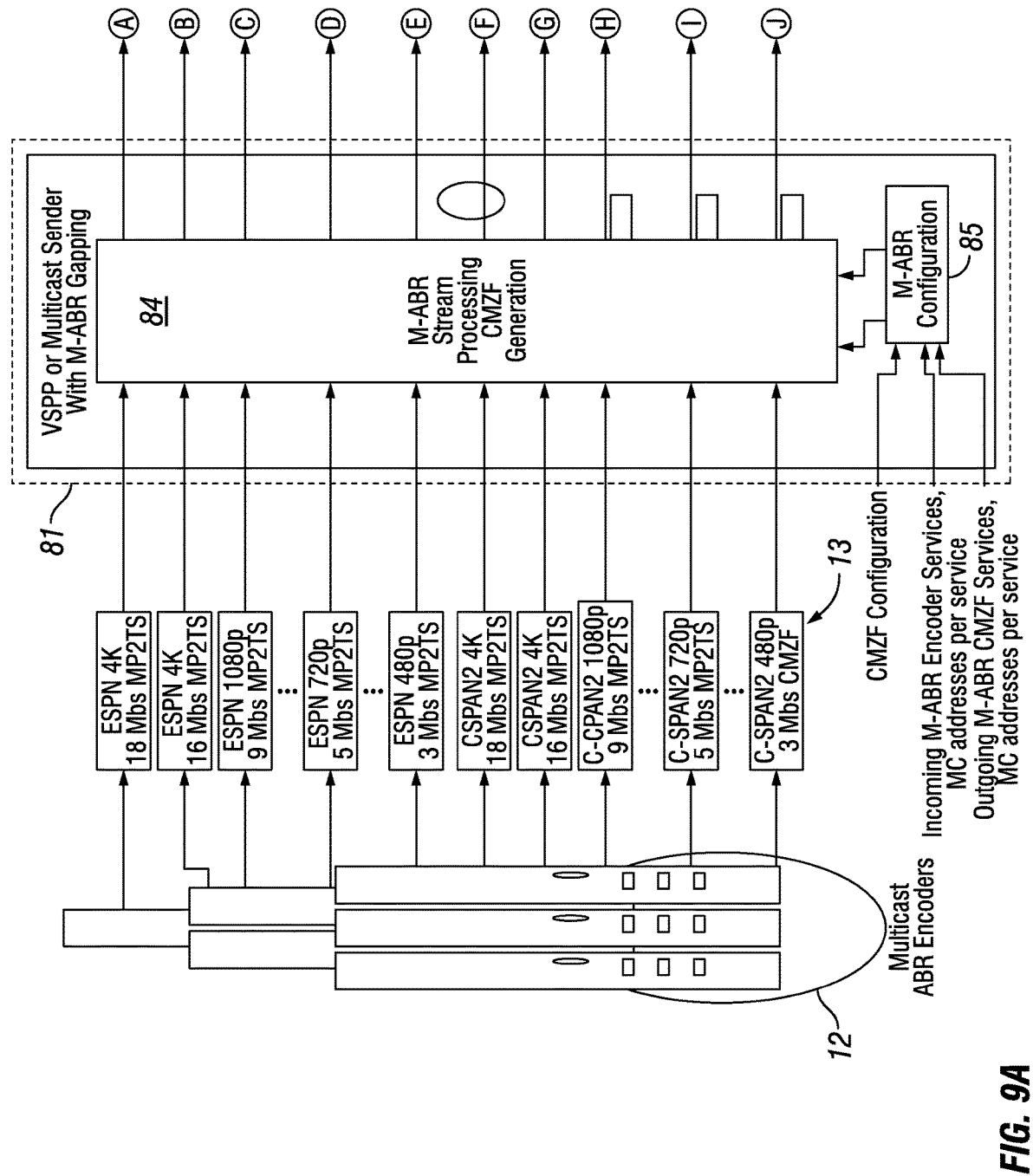
FIGS. 9A-9B are portions of a simplified block diagram illustrating an exemplary embodiment of a Multicast Sender with CMZF generation and with the gapping functionality removed.
Figure 9B:
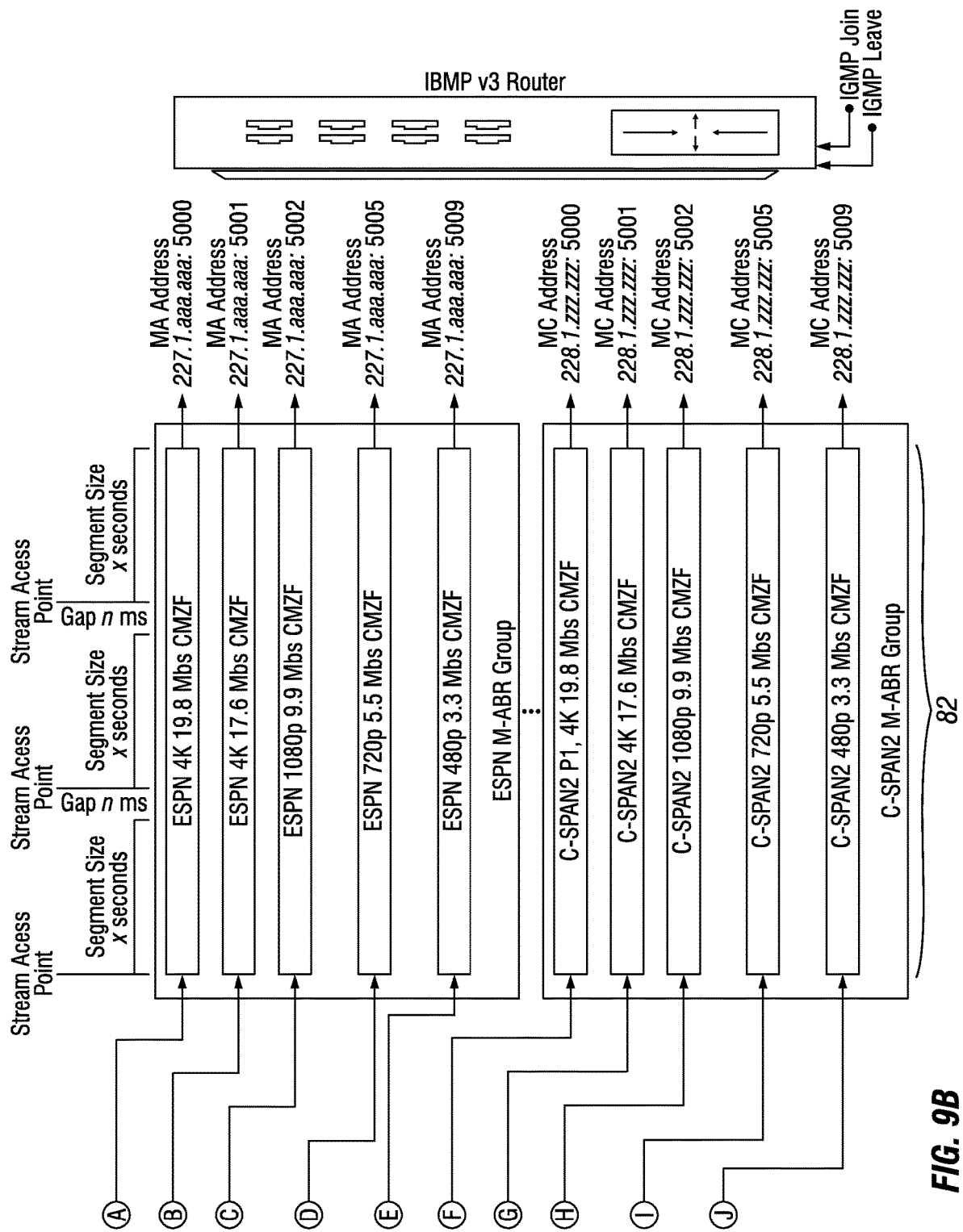

FIGS. 9A-9B are portions of a simplified block diagram illustrating an exemplary embodiment of the CMZF Generator and Multicast Sender 81 with CMZF generation and with the gapping functionality removed. Referring to FIG. 9A, a MABR Stream Processing CMZF generator 84 converts the incoming MP2TS media streams 13 to CMZF streams in a manner similar to the MABR Stream Processing CMZF generator 21 in the gapped transmission embodiment of FIG. 4. The MABR Stream Processing CMZF generator 84 simply multicasts the non-gapped CMZF streams 82 on the defined outgoing CMZF-configured service multicast addresses, as shown in FIG. 9B.

A non-gapped MABR configuration unit 85 provides the CMZF configuration to the MABR Stream Processing CMZF generator 84, which converts the MP2TS streams 13 into the CMZF format. The non-gapped MABR configuration unit receives as inputs (1) a CMZF configuration to properly generate the CMZF, (2) incoming MABR Encoder Services and multicast addresses per service as well as the bit rate of the stream encoding (however this may be calculated), and (3) outgoing MABR CMZF services and MC addresses per service to define the multicast addresses for re-transmitting the non-gapped CMZF services streams 82.

Figure 10A:
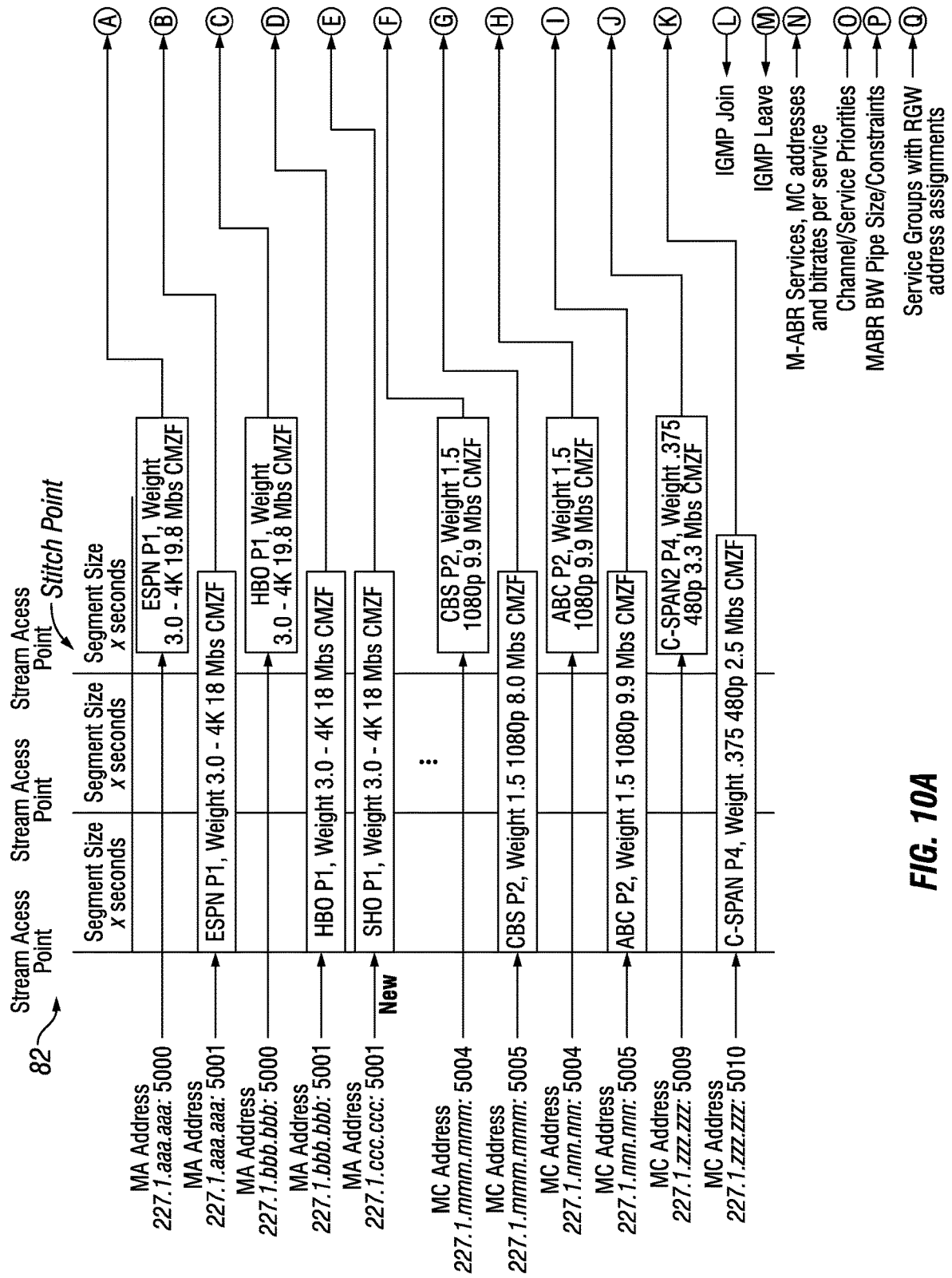
FIGS. 10A-10B are portions of a simplified block diagram illustrating an exemplary embodiment of the MABR Bandwidth Control Agent with non-gapped segment transmission while prepping for a bit rate change.
Figure 10B:
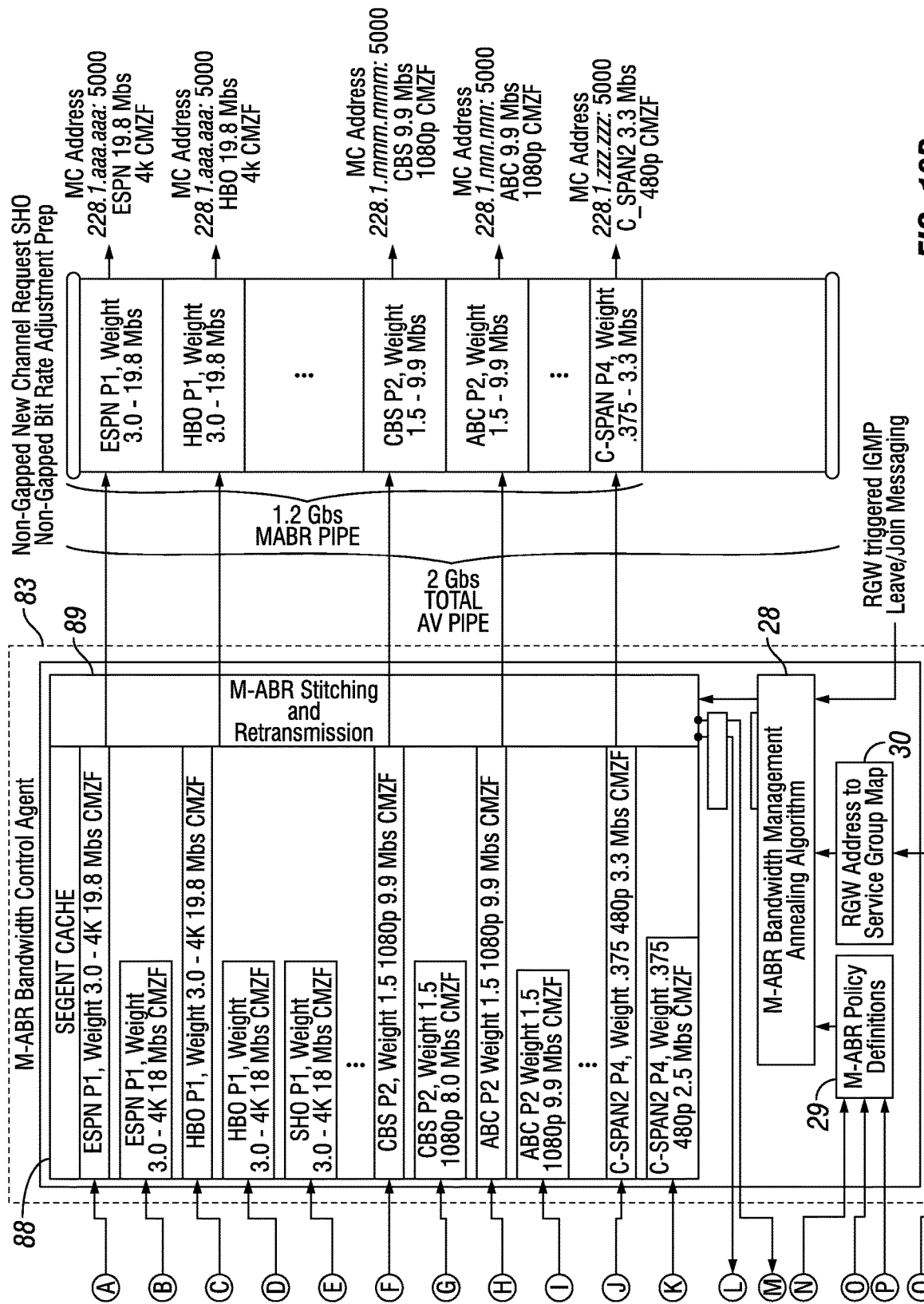

FIGS. 10A-10B are portions of a simplified block diagram illustrating an exemplary embodiment of the non-gapped MABR BCA 83 with non-gapped segment transmission while prepping for a bit rate change. FIG. 10A illustrates the non-gapped CMZF services streams 82 received from the MABR Stream Processing CMZF generator 84.

Referring to FIG. 10B, the configuration is shown when the non-gapped MABR BCA must adjust bit rates in a non-gapped situation as a result of bringing a new channel online in response to a STB requesting the new channel. In this case, an original incoming multicast address must remain joined at the current bitrate. At the same time, the new requested multicast address must also be joined at its different bitrate. Data from the new stream is stored in a cache 88 while waiting for a Stream Access Point (SAP) in the new stream. A MABR Stitching and Retransmission unit 89 begins examining the stream for the proper time to perform the switch. Once the proper SAP is reached in the stream to join, the original stream prior to the switch is left. The MABR Stitching and Retransmission unit processes/ stitches the stream and begins streaming the newly switched-to stream to the homes. The MABR bandwidth management decision engine remains the same as in the gapped embodiment described above.

The determination of the proper multicast address to join is determined by the MABR Bandwidth Management Annealing Algorithm 28. As in the first embodiment, configuration inputs to the Annealing Algorithm are provided by the MABR Policy Definitions unit 29 and the RGW Address to Service Group Map 30. Additionally, the Annealing Algorithm receives RGW-triggered IMGP Leave/Join messaging. Inputs to the MABR Policy Definitions unit 29 include (1) MABR services, MC addresses, and bitrates per service (alternatively, bit rates may be calculated); (2) Channel/Service Priorities for policy control per service, and (3) MABR Bandwidth pipe size/constraints for each pipe per service group. Input to the RGW Address to Service Group Map 30 includes information regarding outbound service multicast address definitions/assignments for the delivery of the services to the homes (i.e., service groups with RGW assignments grouped into the proper service groups).

Although FIG. 10A illustrates CMZF streams incoming, it should be noted that the MABR BCA has the ability to process other types of input stream formats such as MPEG2TS streams containing video and audio, data, MP4 multiplexed segments embedded in MPEG2TS streams, and the like.

Figure 11A:
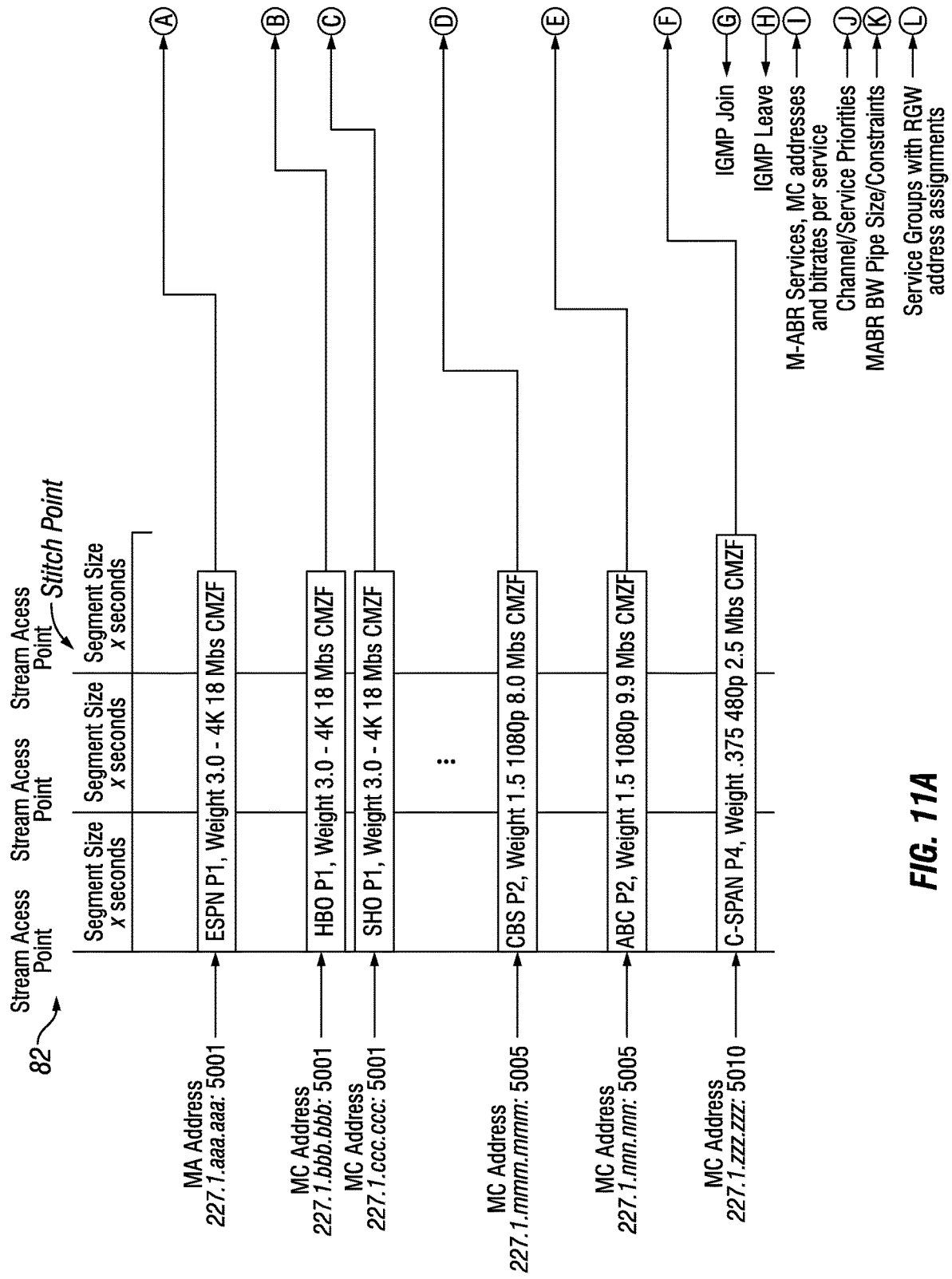
FIGS. 11A-11B are portions of a simplified block diagram illustrating an exemplary embodiment of the MABR Bandwidth Control Agent with non-gapped segment transmission adjusted after a bit rate change.
Figure 11B:
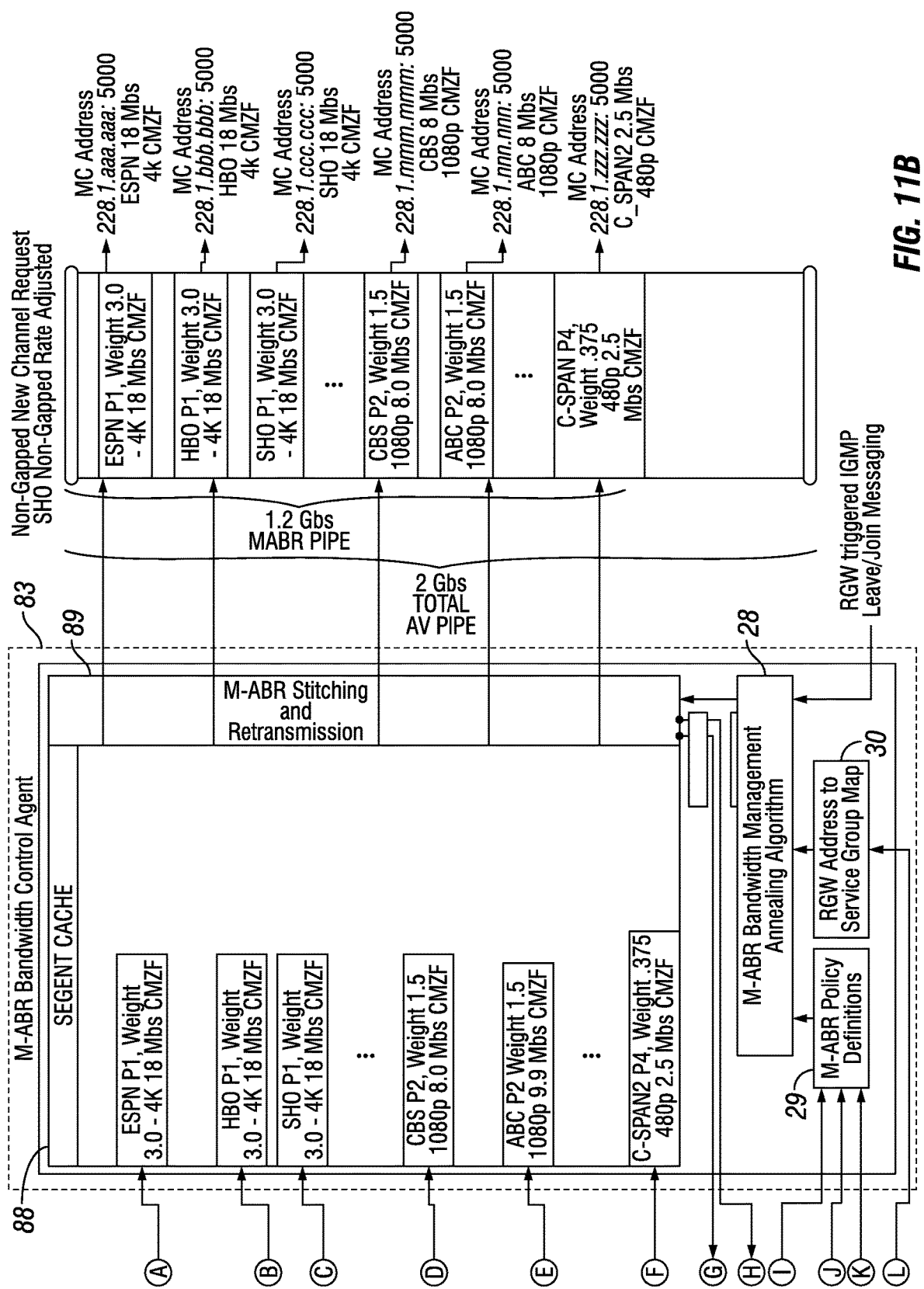

FIGS. 11A-11B are portions of a simplified block diagram illustrating an exemplary embodiment of the MABR Bandwidth Control Agent with non-gapped segment transmission adjusted after a bit rate change. FIG. 11A illustrates the non-gapped CMZF services streams 82 received from the MABR Stream Processing CMZF generator 84.

Referring to FIG. 11B, the configuration is shown at a point in time just after the streams have been properly adjusted based on a new service an STB requested to watch, which was not already joined.

FIGS. 12A-12E are portions of a flow chart illustrating the steps of an exemplary embodiment of a method of managing bandwidth of MABR services within an allocation of bandwidth per service group in an IPTV-over-DOCSIS environment using non-gapped transmission of segments. The logic differs from the gapped embodiment of FIGS. 6A-6D on when to leave an incoming stream. Additionally, steps 134 to 139 are added for performing the required processing to perform the bit rate switch.

Figure 12A:
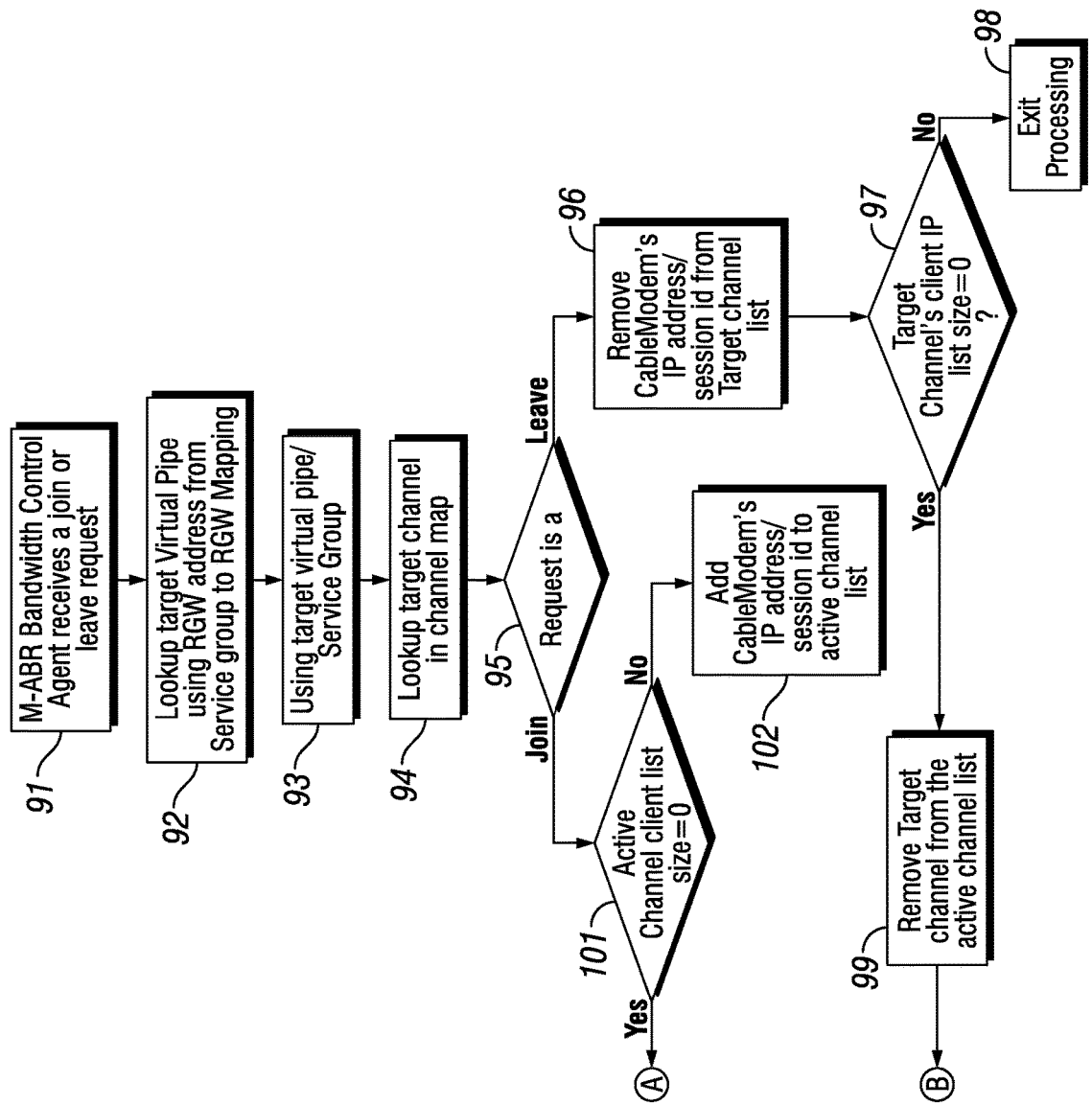
FIGS. 12A-12E are portions of a flow chart illustrating the steps of an exemplary embodiment of a method of managing bandwidth of MABR services within an allocation of bandwidth per service group in an IPTV-over-DOCSIS environment using non-gapped transmission of segments.

Referring first to FIG. 12A, at step 91, the non-gapped MABR BCA 83 receives a Join or Leave request from a requesting client for a change in channels. At step 92, the non-gapped MABR BCA looks up a target virtual pipe using a RGW IP address retrieved from the RGW Address to Service Group Map 30. At step 93, the non-gapped MABR BCA obtains the target virtual pipe and associated service group and at step 94 looks up a target channel in a channel map. At step 95, it is determined whether the request is a Join or a Leave. When the request is a Leave, the method moves to step 96 where the non-gapped MABR BCA removes the cable modem's IP address/session ID from a target channel list. At step 97, it is determined whether the target channel's client IP list size is equal to zero (0). If not, the method exits processing at step 98. When the target channel's client IP list size is equal to zero (0), the method moves to step 99 where the target channel is removed from the active channel list. The method then moves to step 105 of FIG. 12B.

However, when it is determined at step 95 that the request is a Join, the method moves to step 101 where it is determined whether the active channel client list size is equal to zero (0). If not, the method moves to step 102 where the cable modem's IP address/session ID is added to the active channel list. However, when the active channel client list size is equal to zero (0), the method moves instead to step 103 of FIG. 12B.

Figure 12B:
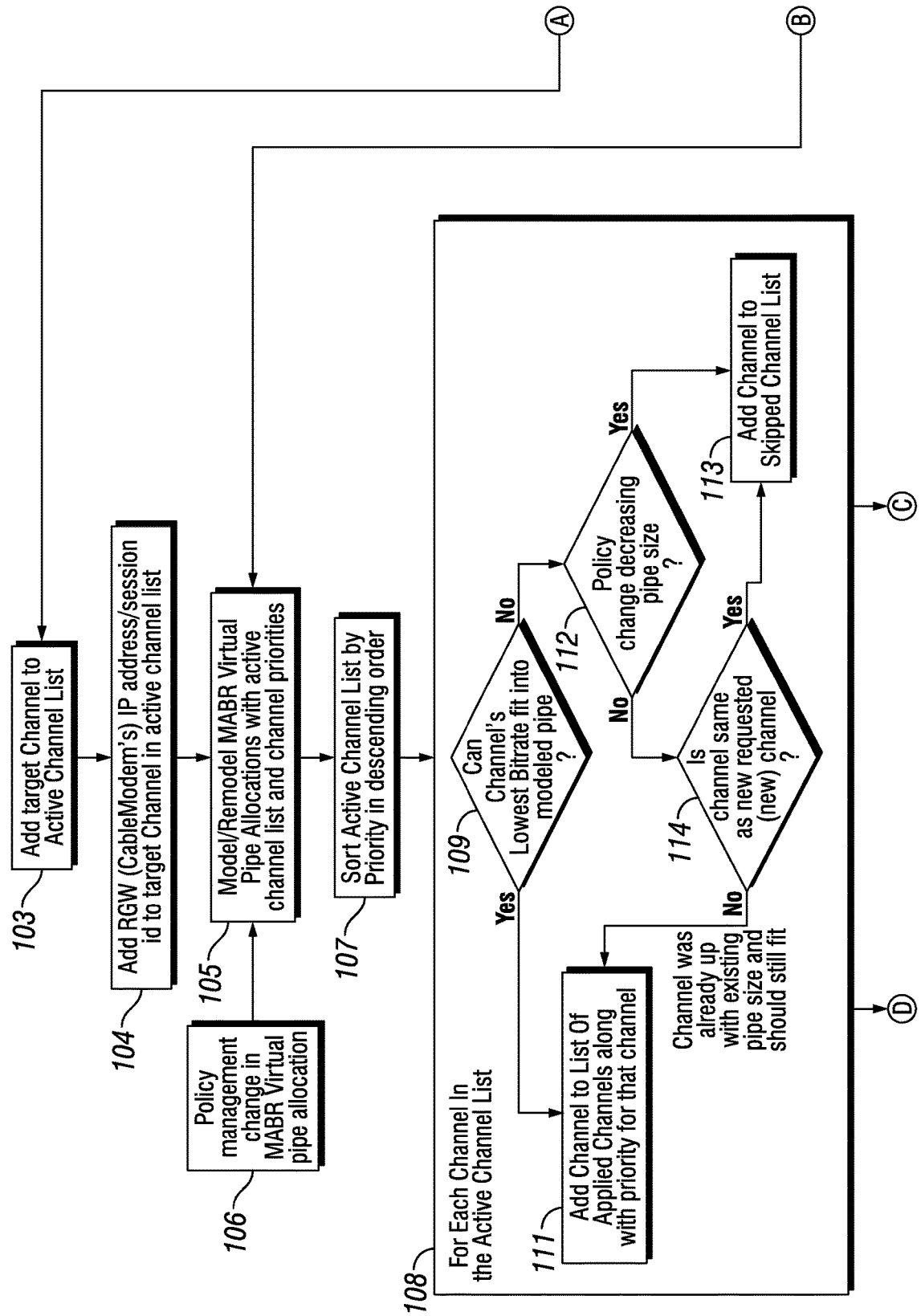

Referring now to FIG. 12B, when the request is a Join request, and the size of the active channel client list is zero (0), the method resumes at step 103 where the target channel is added to the active channel list. At step 104, the RGWs (cable modem's) IP address and session ID are added to the target channel in the active channel list. At step 105, the MABR virtual pipe allocations are modeled or remodeled with input at step 106 from a policy management change in channel priorities and the active channel list from step 104. At step 107, the active channel list is sorted by priority in descending order so that higher priority channels are considered first.

The method then performs process 108 for each channel in the active channel list. At step 109, it is determined whether the channel's lowest bitrate will fit into the modeled virtual pipe. When the channel's lowest bitrate will fit into the modeled pipe, the method moves to step 111 where the channel is added to a list of applied channels, along with the associated priority. However, when it is determined that the channel's lowest bitrate will not fit into the modeled pipe, the method moves instead to step 112 where it is determined whether there is a policy change decreasing the virtual pipe size. If so, the method moves to step 113 where the channel is added to a skipped channel list. When it is determined there is not a policy change decreasing the virtual pipe size, the method moves instead to step 114 where it is determined whether the channel is the same as a requested (new) channel. if so, the method returns to step 113 where the channel is added to the skipped channel list. When it is determined at step 114 that the channel is not the same as the requested (new) channel, it is concluded that the channel was already up with the existing virtual pipe size and should still fit. Therefore, the method moves to step 111 where the channel is added to the list of applied channels, along with the associated priority.

Figure 12C:
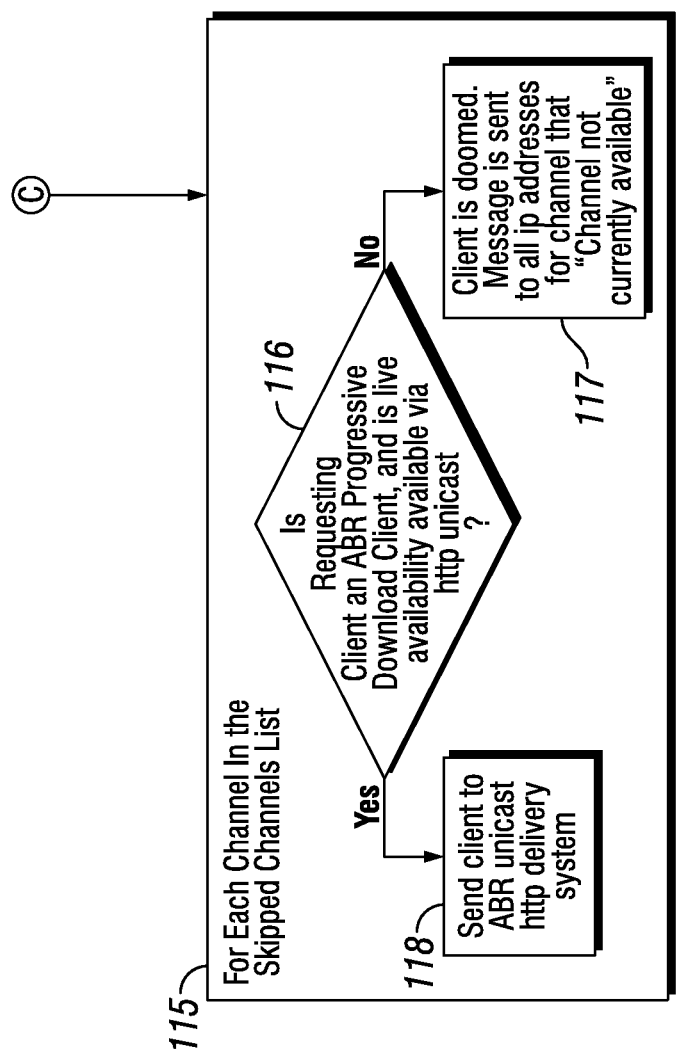

Referring now to FIG. 12C, following step 113 of FIG. 12B, for each channel in the skipped channel list, the method performs process 115. At step 116, it is determined whether the requesting client is an ABR progressive download client and whether live availability is available via http unicast. If not, the requesting client is doomed, and the method moves to step 117 where a message is sent to all IP addresses for the channel indicating the channel is not currently available. However, when, it is determined that the requesting client is an ABR progressive download client and live availability is available via http unicast, the method moves to step 118 where the requesting client is sent to an ABR http unicast delivery system.

Figure 12D:
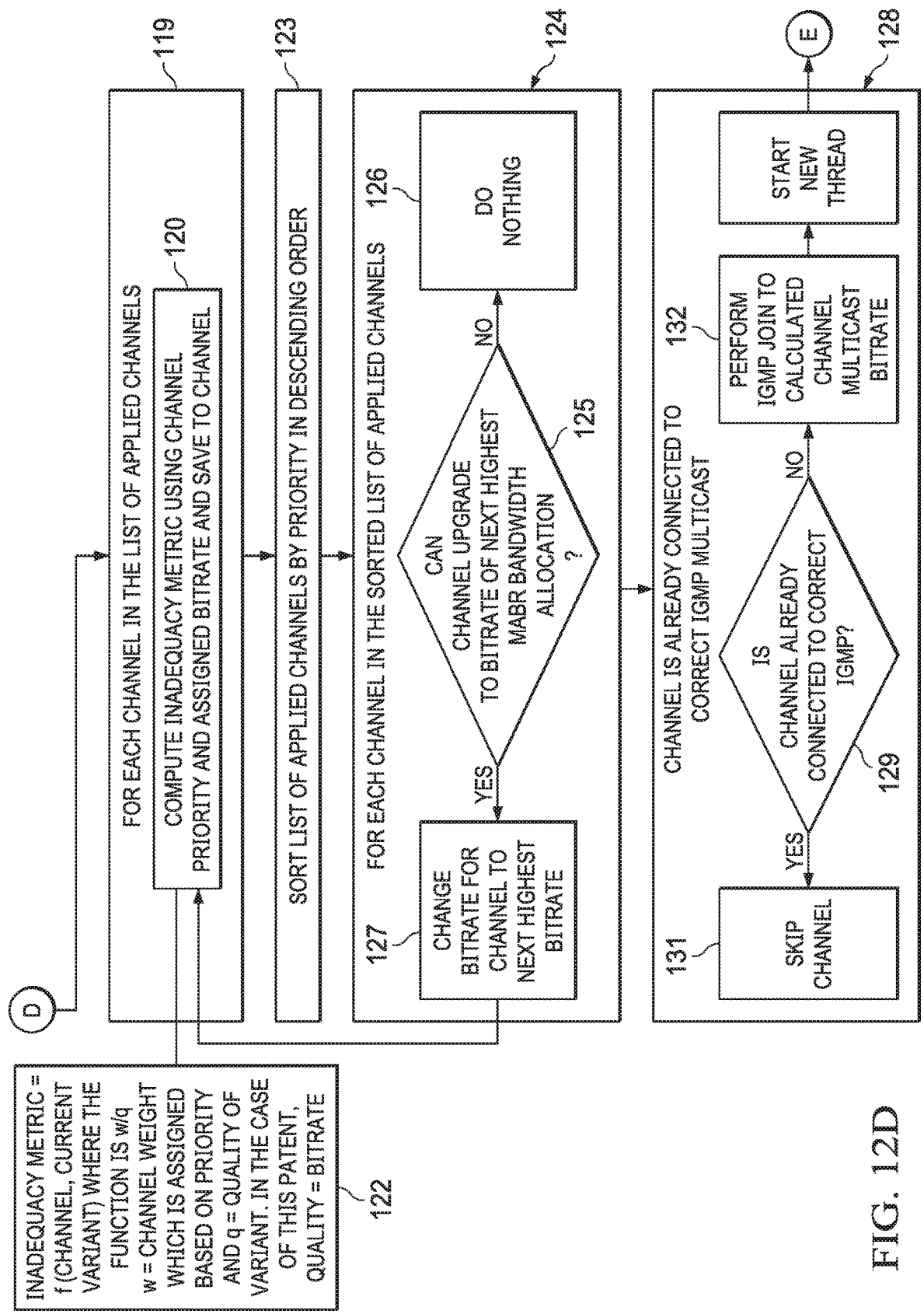

Referring now to FIG. 12D, following step 111 of FIG. 12B, for each channel in the list of applied channels, the method performs process 119. At step 121, an inadequacy metric, as described above, is computed using the channel priority and the assigned bitrate, and this inadequacy metric is saved to the channel. One example of determining the inadequacy metric is shown in example block 122, although other measures of an imbalance may be used in practicing the disclosed method. Once the inadequacy metric has been computed for each channel, the method moves to step 123 where the list of applied channels is sorted by inadequacy metric in descending order, so that the channel that is most out of balance is considered first. The method then performs process 124 for each channel in the sorted list of applied channels, taken in descending order. At step 125, it is determined whether the channel can be upgraded to the bitrate of the next highest MABR bandwidth allocation. When the channel cannot be upgraded to the bitrate of the next highest MABR bandwidth allocation, the method moves to step 126 where nothing is done for that channel. However, when the channel can be upgraded to the bitrate of the next highest MABR bandwidth allocation, the method moves instead to step 127 where the bitrate for the channel is changed to the next highest bitrate. The method then returns to process 119. In practice, since only one channel has a changed bitrate, it is necessary only to recalculate the inadequacy metric for the channel that has just been bumped to a new bitrate and to again sort the list of applied channels. This return to an earlier step is necessary because the channel that has just received a bump in bitrate may still be the furthest out of balance, e.g., if the channel receiving the bump is associated with a priority 1 channel policy while the other channels are priority 3.

Once process 124 has been completed, the method performs process 128. At step 129, it is determined whether the channel is already connected to the correct Internet Group Management Protocol (IGMP) multicast. If so, there is no need to change the connection and the stream is skipped at step 131. However, when the channel is not already connected to the correct IGMP multicast, the method moves to step 132 where the gateway leaves the existing channel multicast and performs an IGMP Join to the calculated channel multicast bitrate. The method then moves to step 133 and starts a new process 134 as shown in FIG. 12E.

Figure 12E:
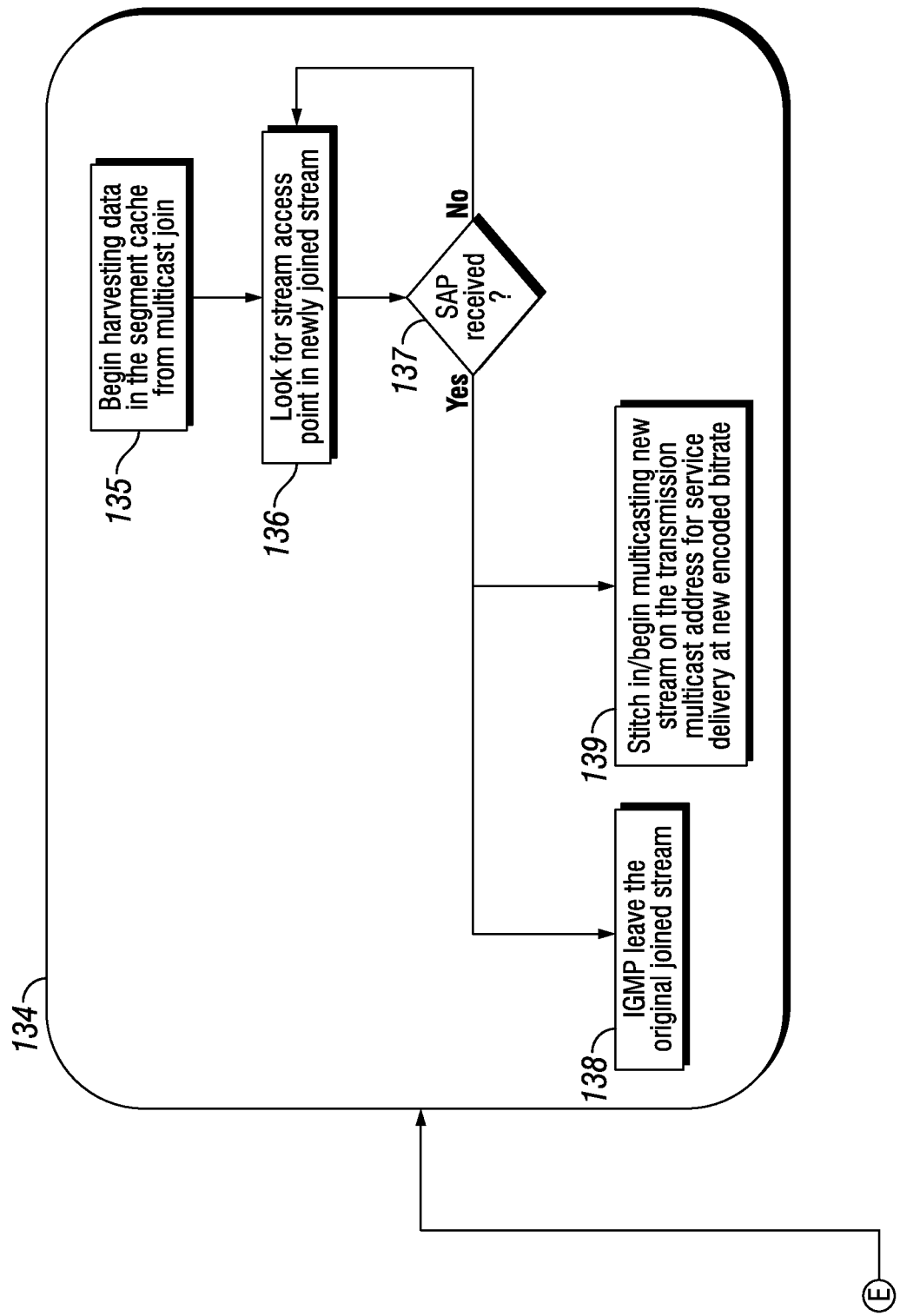

Referring now to FIG. 12E, following step 133 of FIG. 12D, the method moves to step 135 and begins harvesting data in the cache 88 from the newly joined stream. At step 136, the method looks for a SAP in the newly joined stream. At step 137, it is determined whether the SAP has been received. If not, the method returns to step 136 and continues to look for the SAP. When the SAP is received, the method moves to step 138 where an IMGP Leave is performed to leave the original joined stream. At step 139, the stored data for the newly joined stream is stitched in, and the non-gapped MABR BCA 83 begins multicasting the new stream on the transmission multicast address for service delivery at the new encoded bitrate of the newly joined stream.

Figure 13:
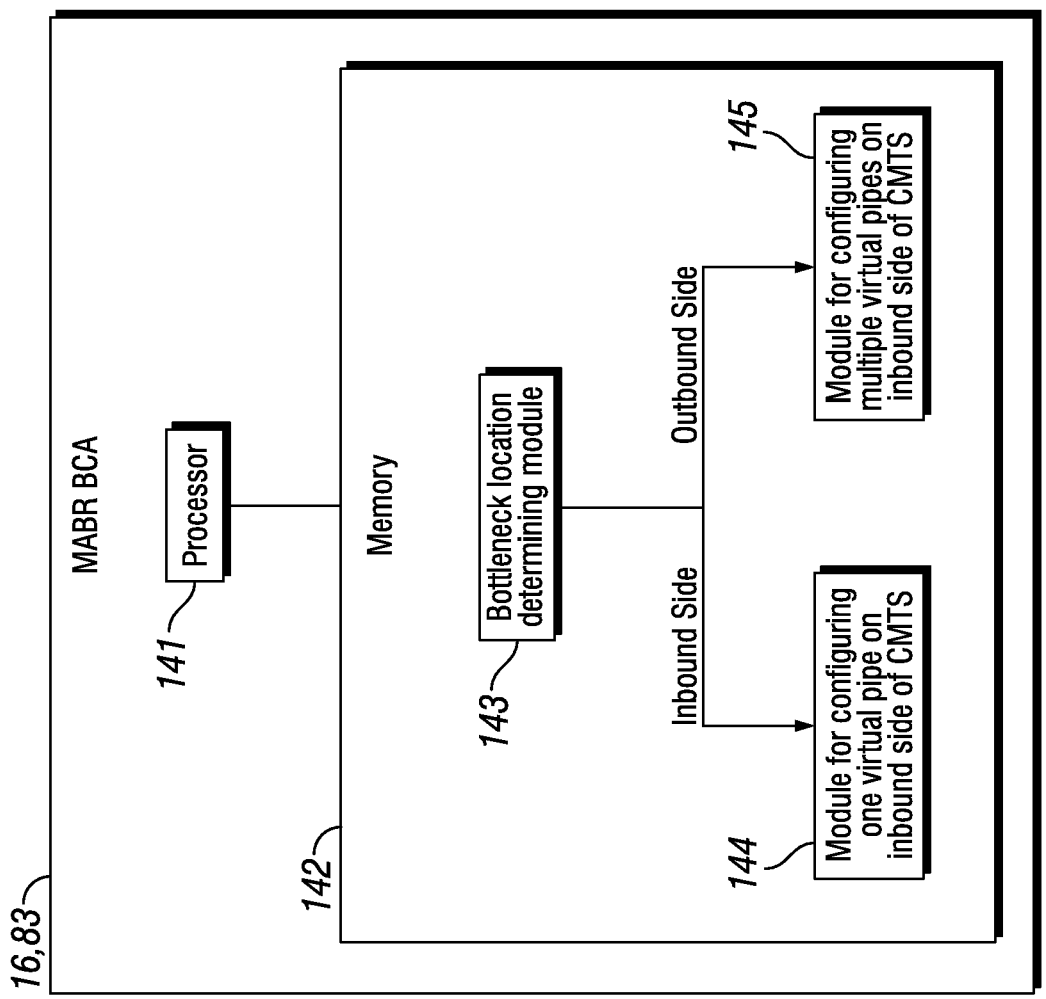
FIG. 13 is a simplified schematic block diagram of the MABR BCA with functional modules.

FIG. 13 is a simplified schematic block diagram of the MABR BCA 16, 83 with functional modules. The MABR BCA includes a processor 141 and a memory 142. The memory stores functional modules 143-145. In at least one embodiment, the functional modules are implemented as a computer program running on the processor. The functional modules include a Bottleneck Location Determination module 143 that determines whether a bandwidth bottleneck is on an inbound side or an outbound side of the CMTS 18. A first configuration module 144 configures one virtual pipe on the inbound side of the CMTS when the bottleneck is located on the inbound side of the CMTS. This process is described in more detail above in step 3 of FIG. 1 and in FIGS. 2 and 7. A second configuration module 145 configures multiple virtual pipes on the inbound side of the CMTS when the bottleneck is located on the outbound side of the CMTS. This process is described in more detail above in step 4 of FIG. 1 and in FIGS. 3 and 8.

Figure 14:
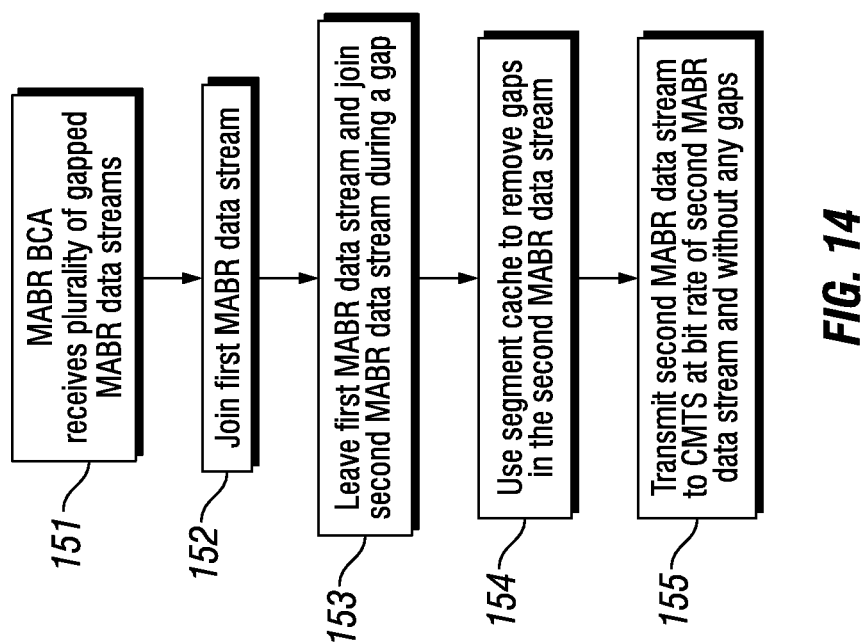
FIG. 14 is a flow chart illustrating the steps of an exemplary embodiment of a method of switching from a first MABR data stream to a second MABR data stream when using gapped segment transmission.

FIG. 14 is a flow chart illustrating the steps of an exemplary embodiment of a method of switching from a first MABR data stream to a second MABR data stream when using gapped segment transmission. At step 151, the MABR BCA 16 receives a plurality of gapped MABR data streams as described above in connection with FIG. 2. At step 152, the first MABR stream is joined. At step 153, the MABR BCA leaves the first MABR data stream and joins the second MABR data stream during a gap so that no data is lost. At step 154, the MABR BCA uses the segment cache 26 to remove the gaps in the second MABR data stream. At step 155, the MABR BCA transmits the second MABR data stream to the CMTS 18 at the bit rate of the second MABR data stream and without any gaps.

In the drawings and specification, there have been disclosed typical preferred embodiments of the disclosure and, although specific terms are employed, they are used in a generic and descriptive sense only and not for purposes of limitation, the scope of the invention being set forth in the following claims.

What is claimed is:

1. A method implemented by a Multicast Adaptive Bitrate Bandwidth Control Agent (MABR BCA) for managing bandwidth of a plurality of MABR data streams in an Internet Protocol Television (IPTV) over Data Over Cable Service Interface Specification (DOCSIS) system, the method comprising:
   determining that a bandwidth bottleneck exists on an inbound IP-network side of a Cable Modem Termination System (CMTS) or on an outbound DOCSIS/Radio Frequency (RF)-network side of the CMTS;
   based on the determination that the bottleneck is on the outbound DOCSIS/RF-network side of the CMTS, configuring multiple virtual pipes on the inbound IP-network side of the CMTS, wherein a respective virtual pipe, of the multiple virtual pipes, is configured for each service group, of a plurality of service groups, to manage the bandwidth per service group for output RF ports on the CMTS, wherein the multiple virtual pipes output multiple multicast streams of a service at different bitrates; and
   based on the determination that the bottleneck is on the inbound IP-network side of the CMTS, managing the bandwidth for input Ethernet ports on the CMTS by configuring one virtual pipe on the inbound IP-network side of the CMTS for all service groups of the plurality of service groups, wherein the one virtual pipe outputs a single multicast stream of the service at a single bitrate.

2. The method according to claim 1, wherein the method further comprises:
   receiving the plurality of MABR data streams, each data stream comprising a plurality of data segments separated by gaps coincident with gaps in each of the other data streams, wherein each data stream includes data from a different multicast address and each data stream is encoded at a different bit rate;
   joining a first one of the data streams;
   during one of the coincident gaps between data segments, leaving the first one of the data streams and joining a different, second one of the data streams without video data loss;
   utilizing a segment cache to remove the gaps between the data segments in the second data stream; and
   transmitting the second data stream to the CMTS at the bit rate of the second data stream and without any gaps.

3. The method according to claim 1, wherein the method further comprises allocating bandwidth within a dynamic streaming pipe for MABR and Unicast Adaptive Bitrate (UABR) channels, the allocating step comprising:
   receiving a request from a requesting client for to change to a target channel;
   adding the target channel to an active channel list;
   modelling MABR virtual pipe allocations with the active channel list and channel priorities;
   sorting the active channel list by priority in descending order;
   for each channel in the sorted active channel list, adding the channel to a list of applied channels along with the priority for the channel after determining that a lowest bitrate of the channel will fit into the modeled pipe;
   for each channel in the list of applied channels, computing an inadequacy metric using the channel priority and assigned bitrate, and sorting the list of applied channels by inadequacy metric in descending order;
   for each channel in the sorted list of applied channels, changing the bitrate for the channel to a next highest bitrate using the existing MABR client bandwidth allocation after determining that the channel can upgrade to the bitrate of the next highest MABR bandwidth allocation; and
   based on a determination that the channel is not already connected to a correct Internet Group Management Protocol (IGMP) group, performing an IGMP join to the determined channel multicast bitrate for the newly joined channel.

4. The method according to claim 3, wherein after receiving the request to change to a target channel, the step of adding the target channel to an active channel list includes:
   looking up a target virtual pipe using a residential gateway (RGW) IP address;
   looking up the target channel in a channel map using a target virtual pipe and associated service group;
   based on a determination that the request is a Join request, and a size of an active channel client list is zero (0):
      adding the target channel to the active channel list; and
      adding the RGW's IP address and session ID to the target channel.

5. The method according to claim 4, wherein for each channel in the sorted active channel list, the step of adding the channel to a list of applied channels along with the priority for the channel includes:
   determining whether the lowest bitrate associated with the channel will fit into the modeled pipe; and
   upon determining that the lowest bitrate will fit into the modeled pipe, adding the channel to the list of applied channels along with the priority for the channel.

6. The method according to claim 5, wherein upon determining that the lowest bitrate will not fit into the modeled pipe and there is a policy change decreasing the size of the pipe, the method further comprises adding the channel to a skipped channel list.

7. The method according to claim 6, further comprising, for each channel in the skipped channel list:
   determining whether the requesting client is an ABR progressive download client and whether live availability is available via http unicast;
   based on the determination that the requesting client is an ABR progressive download client and live availability is available via http unicast, sending the client to an ABR unicast http delivery system; and
   based on the determination that the requesting client is not an ABR progressive download client or live availability is not available via http unicast, sending a message to all IP addresses for the channel indicating the channel is not available.

8. The method according to claim 5, wherein for each channel in the sorted list of applied channels, the step of changing the bitrate for the channel to a next highest bitrate using the existing MABR client bandwidth allocation includes:
- determining whether the channel can upgrade to the bitrate of the next highest MABR bandwidth allocation;
- based on the determination that the channel can upgrade to the bitrate of the next highest MABR bandwidth allocation, changing the bitrate for the channel to the next highest bitrate and returning to the step of computing the inadequacy metric; and
- based on the determination that the channel cannot upgrade to the bitrate of the next highest MABR bandwidth allocation, taking no action.

9. The method according to claim 8, wherein once all bitrates are determined, for each channel in the sorted list of applied channels, the step of performing an IGMP join to the determined channel multicast bitrate for the newly joined channel includes:
- determining whether the channel is already connected to a correct IGMP group;
- based on the determination that the channel is already connected to a correct IGMP group, skipping the channel; and
- based on a determination that the channel is not already connected to a correct IGMP group, performing the IGMP join to the determined channel multicast bitrate for the newly joined channel.

10. The method according to claim 1, wherein the method further comprises:
- receiving the plurality of MABR data streams, wherein each data stream is non-gapped and includes data from a different multicast address and each data stream is encoded at a different bit rate;
- joining a first one of the data streams;
- joining a simultaneous, second one of the data streams;
- storing data from the second one of the data streams in a cache while waiting for a Stream Access Point (SAP) in the second one of the data streams;
- upon receiving the SAP in the second one of the data streams:
  - leaving the first one of the data streams; and
  - stitching the stored data and transmitting the second one of the data streams to the CMTS at the encoded bit rate of the second one of the data streams.

11. The method according to claim 1, wherein each data stream is non-gapped and includes data from a different multicast address and each data stream is encoded at a different bit rate, wherein the method further comprises allocating bandwidth within a dynamic streaming pipe for MABR and Unicast Adaptive Bitrate (UABR) channels, the allocating step comprising:
- receiving a request from a requesting client for to change to a target channel;
- adding the target channel to an active channel list;
- modelling MABR virtual pipe allocations with the active channel list and channel priorities;
- sorting the active channel list by priority in descending order;
- for each channel in the sorted active channel list, adding the channel to a list of applied channels along with the priority for the channel after determining that a lowest bitrate of the channel will fit into the modeled pipe;
- for each channel in the list of applied channels, computing an inadequacy metric using the channel priority and assigned bitrate, and sorting the list of applied channels by inadequacy metric in descending order;
- for each channel in the sorted list of applied channels, changing the bitrate for the channel to a next highest bitrate using the existing MABR client bandwidth allocation after determining that the channel can upgrade to the bitrate of the next highest MABR bandwidth allocation;
- based on a determination that the channel is not already connected to a correct Internet Group Management Protocol (IGMP) group, performing an IGMP join to the determined channel multicast bitrate for the newly joined channel;
- storing data from the newly joined channel in a segment cache while waiting for a Stream Access Point (SAP) in the newly joined channel;
- upon receiving the SAP in the newly joined channel:
  - leaving an originally joined channel; and
  - stitching the stored data and transmitting the newly joined channel on a transmission multicast address at the encoded bit rate of the newly joined channel.

12. A Multicast Adaptive Bitrate (MABR) Bandwidth Control Agent (BCA) configured to manage bandwidth of a plurality of MABR data streams in an Internet Protocol Television (IPTV) over Data Over Cable Service Interface Specification (DOCSIS) system, the MABR BCA comprising:
- a processing circuit; and
- a non-transitory memory that stores computer readable program code;
- wherein the processing circuit executes the computer readable program code such that the MABR BCA is configured to:
  - determine that a bandwidth bottleneck exists on an inbound IP-network side of a Cable Modem Termination System (CMTS) or on an outbound DOCSIS/Radio Frequency (RF)-network side of the CMTS;
  - based on the determination that the bottleneck is on the outbound DOCSIS/RF-network side of the CMTS, configure multiple virtual pipes on the inbound IP-network side of the CMTS, wherein a respective virtual pipe, of the multiple virtual pipes, is configured for each service group, of a plurality of service groups, to manage the bandwidth per service group for output RF ports on the CMTS, wherein the multiple virtual pipes output multiple multicast streams of a service at different bitrates; and
  - based on the determination that the bottleneck is on the inbound IP-network side of the CMTS, manage the bandwidth for input Ethernet ports on the CMTS by configuring one virtual pipe on the inbound IP-network side of the CMTS for all service groups of the plurality of service groups, wherein the one virtual pipe outputs a single multicast stream of the service at a single bitrate.

13. The MABR BCA according to claim 12, further configured to:
- receive the plurality of MABR data streams, each data stream comprising a plurality of data segments separated by gaps coincident with gaps in each of the other data streams, wherein each data stream includes data from a different multicast address and each data stream is encoded at a different bit rate;
- join a first one of the data streams;
- during one of the coincident gaps between data segments, leave the first one of the data streams and join a different, second one of the data streams without video data loss;

utilize a segment cache to remove the gaps between the data segments in the second data stream; and
transmit the second data stream to the CMTS at the bit rate of the second data stream and without any gaps.

14. The MABR BCA according to claim 12, further configured to allocate bandwidth within a dynamic streaming pipe for MABR and Unicast Adaptive Bitrate (UABR) channels, wherein the processor causes the MABR BCA to:
receive a request from a requesting client for to change to a target channel;
add the target channel to an active channel list;
model MABR virtual pipe allocations with the active channel list and channel priorities;
sort the active channel list by priority in descending order;
for each channel in the sorted active channel list, add the channel to a list of applied channels along with the priority for the channel after determining that a lowest bitrate of the channel will fit into the modeled pipe;
for each channel in the list of applied channels, compute an inadequacy metric using the channel priority and assigned bitrate, and sorting the list of applied channels by inadequacy metric in descending order;
for each channel in the sorted list of applied channels, change the bitrate for the channel to a next highest bitrate using the existing MABR client bandwidth allocation after determining that the channel can upgrade to the next highest bitrate; and
based on a determination that the channel is not already connected to a correct Internet Group Management Protocol (IGMP) group, perform an IGMP join to the determined channel multicast bitrate for the newly joined channel.

15. The MABR BCA according to claim 12, further configured to allocate bandwidth within a dynamic streaming pipe for MABR and Unicast Adaptive Bitrate (UABR) channels as follows:
receive the plurality of MABR data streams, wherein each data stream is non-gapped and includes data from a different multicast address and each data stream is encoded at a different bit rate;
join a first one of the data streams;
join a simultaneous, second one of the data streams;
store data from the second one of the data streams in a cache while waiting for a Stream Access Point (SAP) in the second one of the data streams;
upon receiving the SAP in the second one of the data streams:
leave the first one of the data streams; and
stitch the stored data and transmitting the second one of the data streams to the CMTS at the encoded bit rate of the second one of the data streams.

16. The MABR BCA according to claim 12, wherein each data stream is non-gapped and includes data from a different multicast address and each data stream is encoded at a different bit rate, the MABR BCA is further configured to allocate bandwidth within a dynamic streaming pipe for MABR and Unicast Adaptive Bitrate (UABR) channels as follows:
receive a request from a requesting client for to change to a target channel;
add the target channel to an active channel list;
model MABR virtual pipe allocations with the active channel list and channel priorities;
sort the active channel list by priority in descending order;
for each channel in the sorted active channel list, add the channel to a list of applied channels along with the priority for the channel after determining that a lowest bitrate of the channel will fit into the modeled pipe;
for each channel in the list of applied channels, compute an inadequacy metric using the channel priority and assigned bitrate, and sorting the list of applied channels by inadequacy metric in descending order;
for each channel in the sorted list of applied channels, change the bitrate for the channel to a next highest bitrate using the existing MABR client bandwidth allocation after determining that the channel can upgrade to the next highest bitrate;
based on a determination that the channel is not already connected to a correct Internet Group Management Protocol (IGMP) group, perform an IGMP join to the determined channel multicast bitrate for the newly joined channel;
store data from the newly joined channel in a segment cache while waiting for a Stream Access Point (SAP) in the newly joined channel;
upon receiving the SAP in the newly joined channel:
leave an originally joined channel; and
stitch the stored data and transmitting the newly joined channel on a transmission multicast address at the encoded bit rate of the newly joined channel.

17. An architecture for managing bandwidth of a plurality of Multicast Adaptive Bitrate (MABR) data streams in an Internet Protocol Television (IPTV) over Data Over Cable Service Interface Specification (DOCSIS) system, the architecture comprising:
a multicast sender circuitry configured to receive Adaptive Bitrate (ABR) encoded data streams and retransmit MABR gapped data streams comprising discrete video segments separated by gaps produced by burst-transmitting each segment at a higher data rate than an associated stream's encoded data rate; and
a MABR Bandwidth Control Agent (BCA) configured to receive the gapped MABR data streams, perform Leave and Join operations, remove the gaps, define one or more virtual pipes, and retransmit the data streams through an IP network to the CMTS, the MABR BCA comprising:
a processing circuit; and
a non-transitory memory that stores computer readable program code;
wherein the processing circuit executes the computer readable program code such that the MABR BCA is configured to:
determine that a bandwidth bottleneck exists on an inbound IP-network side of a Cable Modem Termination System (CMTS) or on an outbound DOCSIS/Radio Frequency (RF)-network side of the CMTS;
based on the determination that the bottleneck is on the outbound DOCSIS/RF-network side of the CMTS, configure multiple virtual pipes on the inbound IP-network side of the CMTS, wherein a respective virtual pipe, of the multiple virtual pipes, is configured for each service group, of a plurality of service groups, to manage the bandwidth per service group for output RF ports on the CMTS, wherein the multiple virtual pipes output multiple multicast streams of a service at different bitrates; and
based on the determination that the bottleneck is on the inbound IP-network side of the CMTS, manage the bandwidth for input Ethernet ports on the CMTS by configuring one virtual pipe on the inbound IP-network side of the CMTS for all service groups of the plurality of service groups, wherein the one virtual pipe outputs a single multicast stream of the service at a single bitrate.

18. The architecture according to claim 17, wherein the MABR BCA is configured to perform Leave and Join operations as follows:
    join a first one of the MABR data streams;
    during one of the gaps between data segments, leave the first one of the MABR data streams and join a different, second one of the MABR data streams without video data loss;
    utilize a segment cache to remove the gaps between the data segments in the second MABR data stream; and
    transmit the second MABR data stream to the CMTS at the bit rate of the second MABR data stream and without any gaps.

19. An architecture for managing bandwidth of a plurality of Multicast Adaptive Bitrate (MABR) data streams in an Internet Protocol Television (IPTV) over Data Over Cable Service Interface Specification (DOCSIS) system, the architecture comprising:
    a multicast sender circuitry configured to receive Adaptive Bitrate (ABR) encoded data streams and retransmit MABR data streams, wherein each MABR data stream is non-gapped and includes data from a different multicast address and each data stream is encoded at a different bit rate; and
    a MABR Bandwidth Control Agent (BCA) configured to receive the MABR non-gapped data streams, perform Leave and Join operations, define one or more virtual pipes, and retransmit the data streams through an IP network to the CMTS, the MABR BCA comprising:
        a processing circuit; and
        a non-transitory memory that stores computer readable program code;
        wherein the processing circuit executes the computer readable program code such that the MABR BCA is configured to:
            determine that a bandwidth bottleneck exists on an inbound IP-network side of a Cable Modem Termination System (CMTS) or on an outbound DOCSIS/Radio Frequency (RF)-network side of the CMTS;
            based on the determination that the bottleneck is on the outbound DOCSIS/RF-network side of the CMTS, configure multiple virtual pipes on the inbound IP-network side of the CMTS, wherein a respective virtual pipe, of the multiple virtual pipes, is configured for each service group, of a plurality of service groups, to manage the bandwidth per service group for output RF ports on the CMTS, wherein the multiple virtual pipes output multiple multicast streams of a service at different bitrates; and
            based on the determination that the bottleneck is on the inbound IP-network side of the CMTS, manage the bandwidth for input Ethernet ports on the CMTS by configuring one virtual pipe on the inbound IP-network side of the CMTS for all service groups of the plurality of service groups, wherein the one virtual pipe outputs a single multicast stream of the service at a single bitrate.

20. The architecture according to claim 19, wherein the MABR BCA is configured to perform Leave and Join operations as follows:
    join a first one of the MABR data streams;
    join a simultaneous, second one of the MABR data streams;
    store data from the second one of the MABR data streams in a cache while waiting for a Stream Access Point (SAP) in the second one of the MABR data streams;
    upon receiving the SAP in the second one of the MABR data streams:
        leave the first one of the MABR data streams; and
        stitch the stored data and transmit the second one of the MABR data streams to the CMTS at the encoded bit rate of the second one of the MABR data streams.

* * * * *